(12) United States Patent
Curtis et al.

(10) Patent No.: US 9,483,304 B2
(45) Date of Patent: Nov. 1, 2016

(54) INTERFACE WIRES FOR A MEASUREMENT SYSTEM DIAGRAM

(75) Inventors: Matthew C. Curtis, Leander, TX (US); Christopher F. Graf, Liberty Hill, TX (US); Matthew E. Novacek, Austin, TX (US); Ariane M. Chan-You, Austin, TX (US); Amanda E. Cruess, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 1275 days.

(21) Appl. No.: 13/193,940

(22) Filed: Jul. 29, 2011

(65) Prior Publication Data

US 2013/0031492 A1 Jan. 31, 2013

(51) Int. Cl.
*G06F 3/01* (2006.01)
*G06F 3/00* (2006.01)
*G06F 9/48* (2006.01)

(52) U.S. Cl.
CPC .................... *G06F 9/4843* (2013.01)

(58) Field of Classification Search
CPC ............... G06F 3/01; G06F 8/34; G06F 8/70
USPC .......... 715/762, 763; 717/127, 106; 341/51; 705/3; 345/734
See application file for complete search history.

(56) References Cited

U.S. PATENT DOCUMENTS

| 7,042,469 | B2 | 5/2006 | Fuller | |
|---|---|---|---|---|
| 7,784,034 | B1 | 8/2010 | Dalcher et al. | |
| 7,849,440 | B1* | 12/2010 | Englehart | 717/106 |
| 7,979,841 | B2 | 7/2011 | Case et al. | |
| 8,312,422 | B2 | 11/2012 | Karatal et al. | |
| 2003/0037316 | A1* | 2/2003 | Kodosky et al. | 717/127 |
| 2003/0184580 | A1* | 10/2003 | Kodosky et al. | 345/734 |
| 2007/0044030 | A1* | 2/2007 | Hayles | G06F 8/34 715/762 |
| 2007/0279262 | A1* | 12/2007 | Aydar et al. | 341/51 |
| 2008/0034297 | A1* | 2/2008 | Correll et al. | 715/763 |
| 2008/0126956 | A1 | 5/2008 | Kodosky et al. | |
| 2009/0100403 | A1* | 4/2009 | Joffrain | G06F 8/70 717/100 |
| 2010/0088117 | A1* | 4/2010 | Belden et al. | 705/3 |

* cited by examiner

*Primary Examiner* — Jennifer To
*Assistant Examiner* — Jasmine Wan
(74) *Attorney, Agent, or Firm* — Meyertons Hood Kivlin Kowert & Goetzel, P.C.; Jeffrey C. Hood; Mark S. Williams

(57) ABSTRACT

A system and method for configuring objects in a system diagram to access interfaces of other objects are described. A first node and a second node may be displayed in the system diagram. The second node may implement one or more interfaces, where each interface includes one or more callable functions. An interface wire connecting the first node to the second node may be displayed in response to user input. The system may automatically configure the first node to access at least one of the one or more interfaces of the second node in response to displaying the interface wire.

17 Claims, 17 Drawing Sheets computer system 82 computer system 90

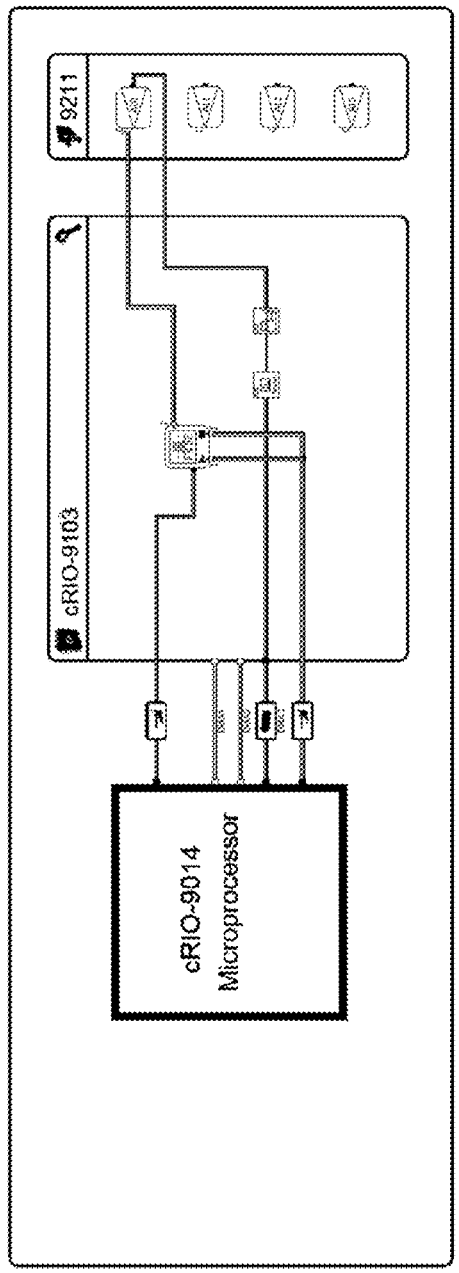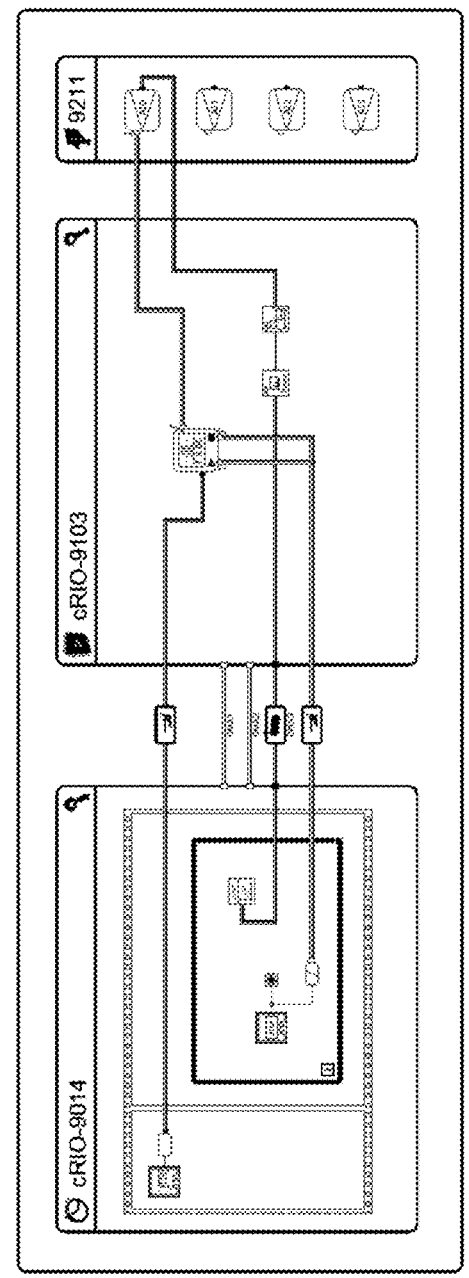
FIG. 6A
FIG. 6B

INTERFACE WIRES FOR A MEASUREMENT SYSTEM DIAGRAM

FIELD OF THE INVENTION

The present invention relates to the field of system diagrams, e.g., for representing test and measurement systems. More particularly, the invention relates to interface wires for configuring objects in a system diagram to access interfaces of other objects.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, distributed execution of programs has become increasingly used, where, for example, various portions of a program are distributed for execution on different platforms. For example, in a typical text-based application, e.g., in a C/C++, etc. application, one can target a particular thread to a particular CPU if the operating system (OS) allows it. On some OS's, one can also target processes. However, currently there are no simple ways to selectively target a specific part of a graphical program diagram to a particular execution target or CPU. Currently, such distribution of graphical programs has generally been performed manually, and with a great deal of difficulty. Additionally, techniques for allowing users to quickly view and interact with such systems have been lacking.

SUMMARY OF THE INVENTION

Various embodiments of a system and method for configuring objects in a system diagram to access interfaces of other objects are described herein. According to one embodiment of the method, a first node and a second node may be displayed in the system diagram. The second node may implement one or more interfaces, where each interface includes one or more callable functions. In some embodiments the system diagram may visually indicate one or more hardware devices on which the first node and the second node are deployed. The method may comprise displaying a wire connecting the first node to the second node in response to user input. The wire is referred to herein as an "interface wire". For example, a system diagram software application may provide a connector tool which the user can use to display an interface wire connecting the two nodes. The method may further comprise configuring the first node to access at least one of the one or more interfaces of the second node in response to displaying the interface wire.

In some embodiments, if the second node implements multiple interfaces, the first node may automatically be configured to access all of the interfaces. In other embodiments the user may select a particular interface, and the consumer node (first node) may be configured to access only the selected interface.

In various embodiments, the first node may be automatically configured to access the interface(s) of the second node in any of various ways. The configuration of the first node may be performed differently depending on how the first node is implemented. In some embodiments the first node may be implemented by program code, such as graphical code or text-based code. The system diagram application may configure the first node to access the interface(s) of the second node by automatically modifying the program code that implements the consumer node, and/or by automatically modifying information used by a software application operable to edit the first node. For example, if the first node is implemented by text-based program code then the system diagram application may automatically add one or more lines of code to the program code to enable the program code to access the interface(s) of the second node. As another example, if the first node is implemented by graphical code in a graphical program then the system diagram application may automatically modify the graphical program to enable the graphical program to access the interface(s) of the owner node. The graphical program may be modified in various ways, such as by adding one or more nodes and/or wire to the graphical program. For example, in some embodiments a node that references the interface of the second node may be automatically added to the graphical program. In other embodiments the system diagram application may not modify the graphical program itself, but may add one or more nodes representing the interface or the functions contained in the interface to a library or palette of nodes that are available for inclusion in the graphical program. The user may then select the desired node(s) from the palette and add the node(s) to the graphical program to configure the graphical program to access the interface of the second node.

The interface(s) of the second node may include multiple functions. The user may configure the first node to call one or more of the functions through the interface(s).

BRIEF DESCRIPTION OF THE DRAWINGS

A better understanding of the present invention can be obtained when the following detailed description of the preferred embodiment is considered in conjunction with the following drawings, in which:

FIGS. 6A and 6B are screen shots of a composite view of a system diagram and a physical diagram according to one embodiment;

Figure 1:
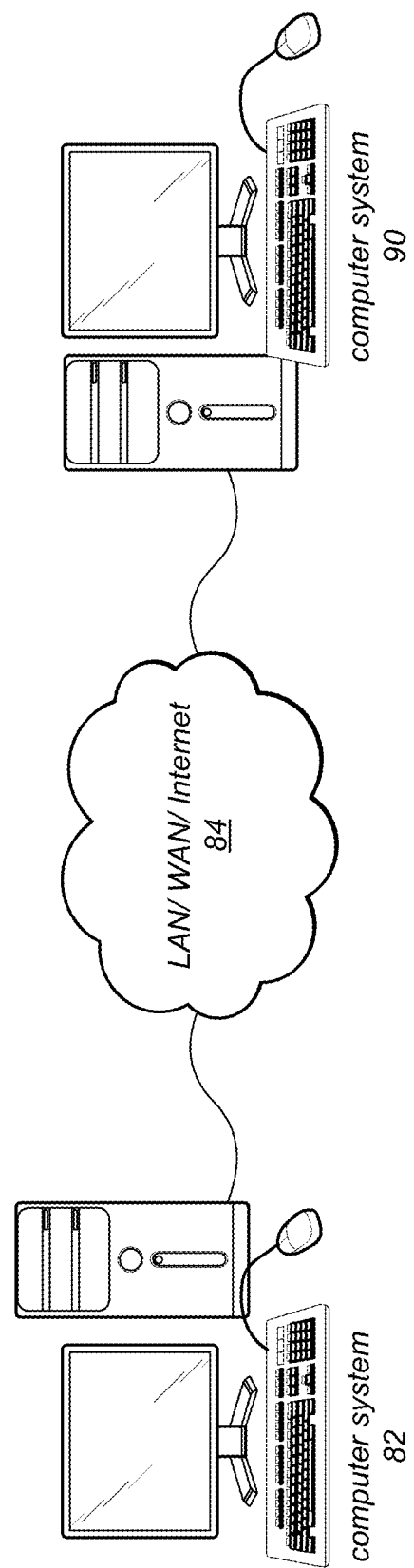
FIG. 1 illustrates a network system comprising two or more computer systems configured according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,042,469, titled "Multiple Views for a Measurement System Diagram," filed Dec. 23, 2002.

U.S. Patent Application Publication No. 2001/0020291 (Ser. No. 09/745,023) titled "System and Method for Programmatically Generating a Graphical Program in Response to Program Information," filed Dec. 20, 2000.

U.S. Patent Application Publication No. 2005/0050515 (Ser. No. 10/892,829) titled "A Graphical Program Which Executes a Timed Loop", filed Jul. 16, 2004.

U.S. patent application Ser. No. 11/462,393 titled "Asynchronous Wires in a Graphical Programming System," filed Aug. 4, 2006.

U.S. patent application Ser. No. 11/776,196, titled "Diagram That Visually Indicates Targeted Execution", filed Jul. 11, 2007, whose inventors were Jeffrey L. Kodosky, David W. Fuller III, Timothy J. Hayles, Jeffrey N. Correll, John R. Breyer, Jacob Kornerup, Darshan K. Shah, and Aljosa Vrancic.

U.S. patent application Ser. No. 12/869,270, titled "Graphically Specifying and Indicating Targeted Execution in a Graphical Program", filed Aug. 26, 2010, whose inventors were Jeffrey L. Kodosky, David W Fuller III, Timothy J. Hayles, Jeffrey N. Correll, John R. Breyer, Jacob Kornerup, Darshan K. Shah, and Aljosa Vrancic.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—A hardware component or device which is operable to execute software, implement code (e.g., program code), be configured according to a hardware description, etc. Processing elements include various processors and/or programmable hardware elements (e.g., field programmable gate arrays (FPGAs)), or systems that contain processors or programmable hardware elements, among others. For example, a processing element may refer to an individual processor in a computer system or the computer system itself.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

FIG. 1—Networked Computer System

FIG. 1 illustrates a system including a first computer system 82 that is coupled to a second computer system 90, where one or both of the computers are operable to create a system diagram including one or more interface wires as described herein. The computer system 82 may be coupled via a network 84 (or a computer bus) to the second computer system 90. The computer systems 82 and 90 may each be any of various types, as desired, the particular types shown in FIG. 1 being exemplary only. For example, in some embodiments, the second computer 90 may be a "computer on a card" in a chassis or even installed in the first computer 82. In another embodiment, the second computer may be a programmable hardware element, such as a field programmable gate array (FPGA), or other programmable logic.

As shown in FIG. 1, the computer system 82 (and/or 90) may include a display device operable to display the system diagram, e.g., as the system diagram is being created and/or executed. The display device may also be operable to display a graphical user interface or front panel of the system diagram during execution of the system diagram. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more software applications enabling the creation of a system diagram that has one or more interface wires. The memory medium may also store operating system software, as well as other software for operation of the computer system. Various embodiments further include receiving or storing instructions and/or data implemented in accordance with the foregoing description upon a carrier medium.

The network 84 can also be any of various types, including a LAN (local area network), WAN (wide area network), the Internet, or an Intranet, among others. In some embodiments the computer systems 82 and 90 may execute a system diagram in a distributed fashion.

The system diagram may be configured with one or more graphical programs. In some embodiments, the graphical user interface of a graphical program may be displayed on a display device of the computer system 82, and the block diagram of the graphical program may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. The graphical program may also be distributed in other ways. For example, various portions of the block diagram of the graphical program may be targeted for execution across multiple targets or platforms.

Figure 2:
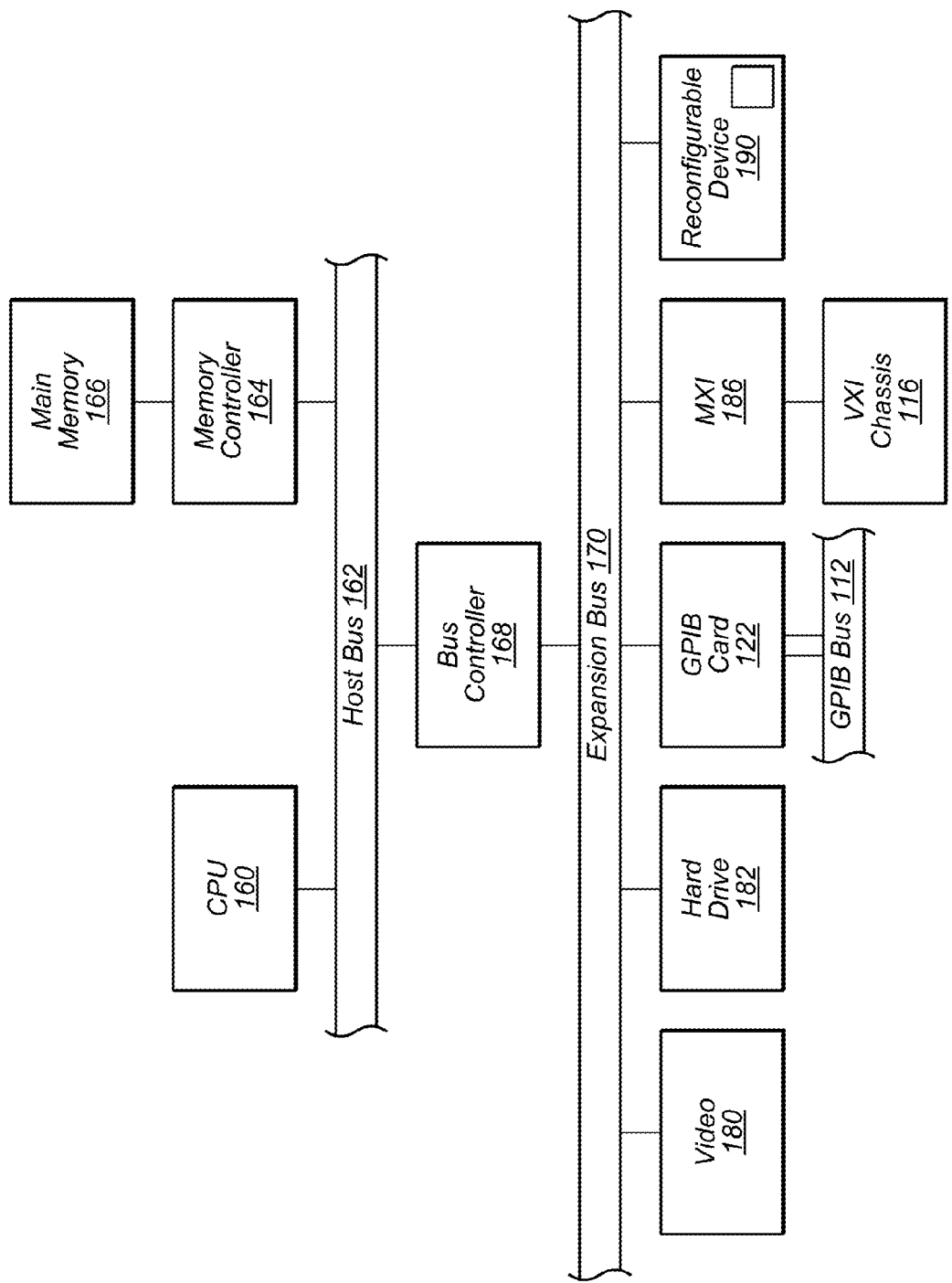
FIG. 2 is a block diagram of an exemplary computer system, according to one embodiment.

FIG. 2—Computer System Block Diagram

FIG. 2 is a block diagram representing one embodiment of the computer system 82 and/or 90 illustrated in FIG. 1, or computer system 82 shown in FIG. 2A or 2B. It is noted that any type of computer system configuration or architecture can be used as desired, and FIG. 2 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory 166 is coupled to the host bus 162 by means of memory controller 164. The main memory 166 may store the system diagram including the one or more interface wires, as well as a development environment for creating the system diagram, and for specifying its distribution over multiple execution targets. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above.

The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program used in the system diagram, or a portion of a graphical program, to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 3A:
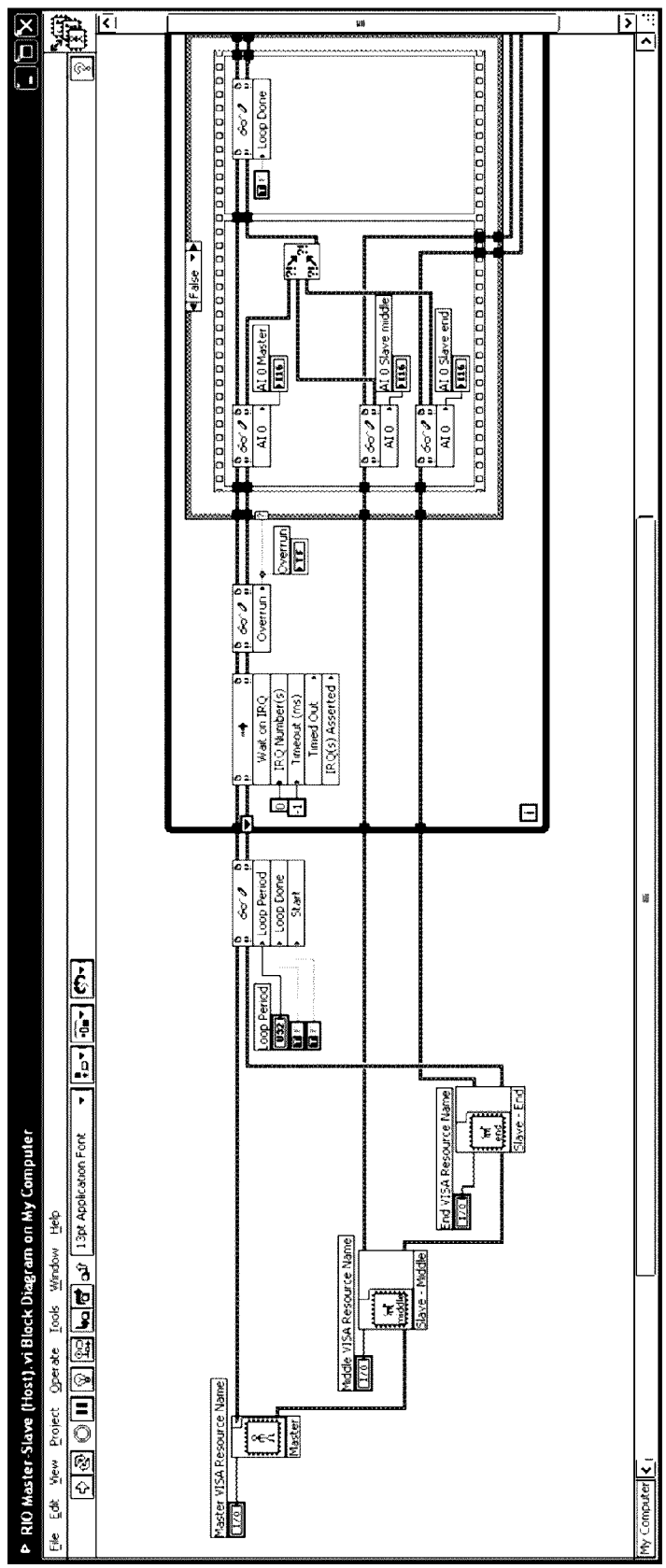
FIGS. 3A and 3B are screen shots of an exemplary graphical program according to one embodiment.
Figure 3B:
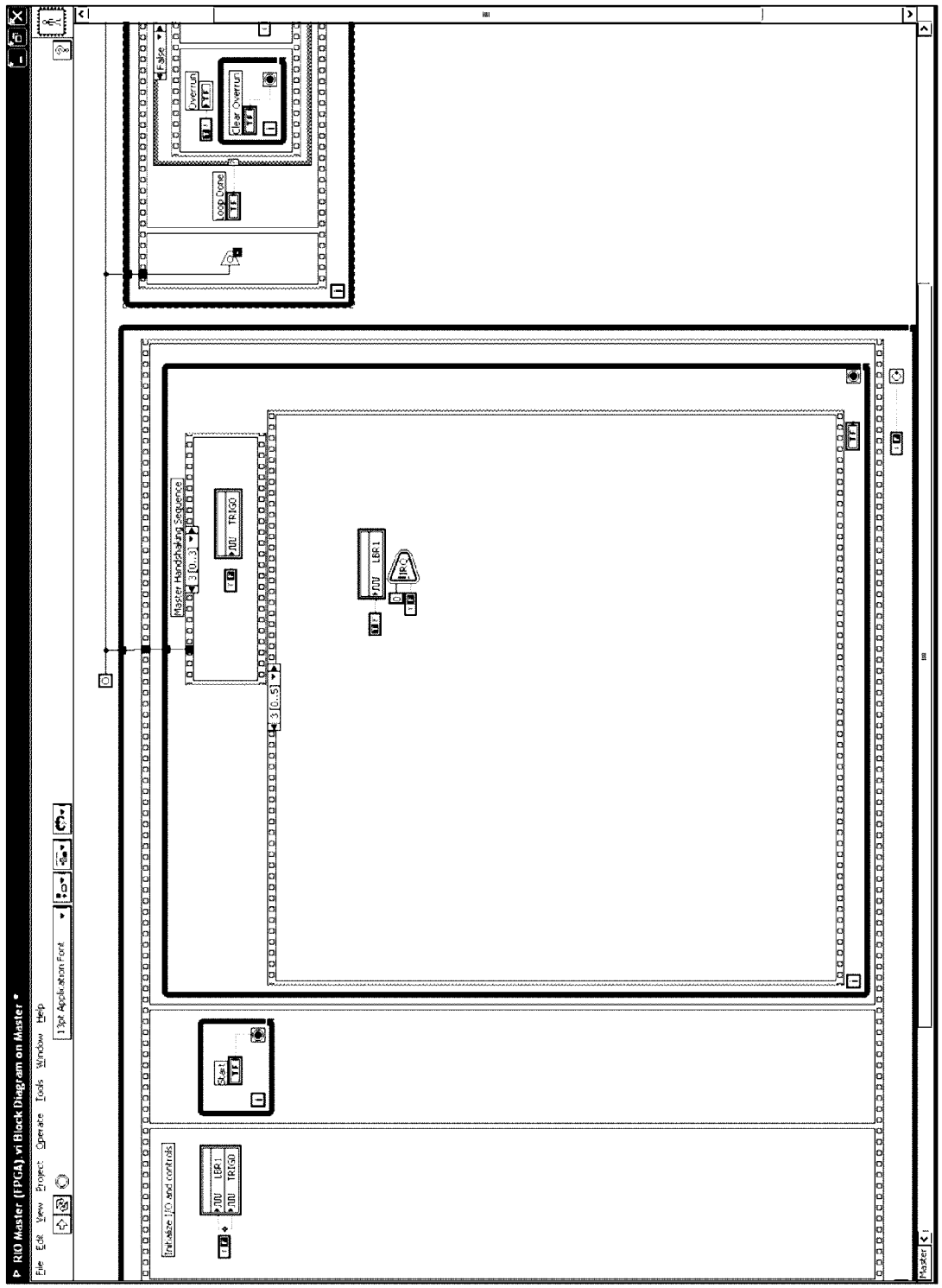

FIGS. 3A and 3B—Exemplary Graphical Programs

A system diagram may be configured to use one or more graphical programs. For example, the system diagram may include an icon representing a particular measurement device, where a graphical program is deployed for execution on the device.

A graphical program may include a block diagram portion and a graphical user interface portion. In some embodiments, the graphical user interface portion may be comprised within the block diagram portion. The block diagram portion may include a plurality of interconnected nodes or icons which visually indicate functionality of the graphical program. Each of the nodes may have one or more inputs and/or outputs for accepting and/or providing data to other nodes in the graphical program. Each of the nodes in the graphical program may represent software functions or executable code. In other words, the nodes in the graphical program may represent or comprise logical elements (e.g., virtual instruments (VIs), primitives, etc.).

The nodes in the graphical program may be interconnected by lines or wires which indicate that indicate that data are provided from a first node to a second node in the graphical program. In some embodiments, the wires may be connected to the terminals of nodes in the graphical program. The terminals may provide connection points for connecting the wires to a node, e.g., to individual inputs or outputs of the node. Additionally, these wires may be configured (e.g., automatically or manually) to provide data synchronously or asynchronously using various data exchange semantics and/or data transfer mechanisms (among others). In some embodiments, wires which indicate transfer of data may be referred to as data transfer wires.

In some embodiments, the graphical program may include one or more structure nodes which indicate control flow among one or more nodes in the graphical program. For example, the graphical program may include a conditional structure node (e.g., to implement conditional branching, if statements, switch statements, signal routing, etc.), a looping structure node for implementing looping among one or more nodes (e.g., while loops, do while loops, for loops, etc.), and/or other control flow nodes.

Additionally, the graphical program may visually indicate where portions of the graphical program are executed. In one embodiment, the visual indication may include a rectangular box that contains a portion of graphical code. In some embodiments, this visual indication may be referred to as a target execution node or icon. The target execution node may have an interior portion where graphical program code that is targeted for execution on a device is contained. For example, a device icon that includes an interior portion that is designed to receive graphical program code may be referred to as a target execution node. Additionally, or alternatively, this node may be referred to as a execution target structure node, as described in U.S. Provisional Ser. No. 60/869,221 and incorporated by reference above. As described in this provisional application, the target execution node may include (e.g., may reference) contextual information that allows the graphical program code to be executed on a target device.

The graphical program may be created or assembled by the user arranging on a display (e.g., of the computer system 82) a plurality of nodes or icons and then interconnecting the nodes to create the graphical program. In some embodiments, the user may select icons and/or wires from various palettes shown in a development environment on the display. In response to the user assembling the graphical program, data structures may be created and stored which represent the graphical program. As noted above, the graphical program may comprise a block diagram and may also include a user interface portion or front panel portion. Where the graphical program includes a user interface portion, the user may optionally assemble the user interface on the display. As one example, the user may use the LabVIEW development environment to create the graphical program.

In an alternate embodiment, the graphical program may be created by the user creating or specifying a prototype, followed by automatic creation of the graphical program from the prototype. This functionality is described in U.S. patent application Ser. No. 09/587,682 titled "System and Method for Automatically Generating a Graphical Program to Perform an Image Processing Algorithm", which was incorporated by reference in its entirety above. Further descriptions regarding automatic creation of graphical programs can be found in U.S. Patent Application Publication No. 2001/0020291 which was also incorporated by reference above. Thus, the graphical program may be created in other manners, either manually (by the user) or automatically, as desired. The graphical program may implement a measurement function that is desired to be performed by one or more devices or instruments (e.g., indicated by target execution icons). In other embodiments, the graphical program may implement other types of functions, e.g., control, automation, simulation, and so forth, as desired.

FIGS. 3A and 3B illustrate exemplary portions of a graphical program according to one embodiment. As shown, the graphical program includes a plurality of interconnected nodes which visually indicates functionality of the graphical program.

Thus, the plurality of interconnected nodes may visually indicate functionality of the graphical program. In other words, during execution of the graphical program, the functionality represented by the plurality of interconnected nodes may be performed.

FIGS. 4A-4G—Exemplary System Diagrams

A system diagram may visually represent a plurality of devices, where program code is deployed on and executed on the devices. Icons (nodes) in the system diagram may represent logical elements such as, for example, software functions or virtual instruments. Graphical indications may be displayed on the system diagram which visually indicate where code represented by the various icons execute. For example, target execution icons may visually outline one or more of the icons and indicate that software represented by those icons execute on a specified target or device. Thus, a target execution icon may include one or more icons or nodes (e.g., in the interior portion of the target execution icon) and may indicate where the one or more icons or nodes are executed. For example, where the target execution icon represents a computer system, the icons or nodes inside the target execution icon may be executed by the computer system. In some embodiments the target execution icons may be automatically populated in the system diagram based on discovery of available devices. Alternatively, the user may include target execution icons by selecting types of devices (or classes of devices) or including template target execution icons and then configuring the target execution icons.

Note that the target execution icon may be "bound" or associated with a specific device. For example, the target execution icon may refer to a single device with a known address (e.g., IP address, bus address, etc.) and the icons or nodes within the target execution icon may be executed by that specific device during execution. The user may choose the specific device by selecting the device from a list of available devices (e.g., as automatically populated or detected by the development environment). For example, the user may configure the target execution icon (e.g., as described above) to select the appropriate device. Note that when a specific device is selected for the target execution icon, the target execution icon may be automatically displayed in the diagram with resources of the specific device visually represented. For example, if a specific microprocessor is selected, the available DMA channels of the processor may be automatically displayed in or on the target execution icon. For example, one or more terminals or wires may be displayed connected to or on the target execution icon which indicate the available DMA channels of the processor. Alternatively, or additionally, the resources of the execution device may be displayed in a palette, and the user may select and associate the resources with nodes in the target execution icon. The palette may indicate whether the resources are available (e.g., by being present or active) or not available (e.g., by not being present or being "grayed out" (or otherwise indicated)). Additionally, a programmable target (one that is able to be configured) may have a visual indication of that programmability (e.g., such as by having a white or open interior portion) whereas one that is not programmable may not have such an indication (e.g., may be grayed out or a different color).

Note that in some embodiments, one or more icons or nodes may be displayed outside of target execution icons. In such embodiments, the one or more icons or nodes may be executed by a default device, system, and/or processing element. For example, nodes outside of any target execution icons (or nodes/software functions not associated with target execution icons) may be executed by a controlling computer system or other processing element. The default processing element may be referred to as the implicit context or execution device of the diagram, whereas target execution icons explicitly define the context or execution device for nodes associated therewith.

In some embodiments, the devices represented in the system (e.g., processing elements, configurable elements, and/or other devices) may be physically present in the system or may be virtual (e.g., the devices may be simulated during execution of the system diagram) as desired. Additionally, these devices may operate according to the functionality visually represented by the icons in the system diagram which represent the devices. Note that the virtual devices of the system diagram may have an underlying model which is usable (e.g., executable) to simulate behavior of a real device corresponding to the virtual device. For example, the underlying model may be a graphical program or other executable code. Alternatively, or additionally, the virtual devices may represent devices that are desired and/or required for the system (e.g., according to user input).

Additionally, as described above regarding graphical programs, one or more GUIs may be associated with the system diagram (e.g., logical or physical components of the system diagram) which may be used during execution of the system diagram. In some embodiments, the GUI(s) may be associated with the graphical program portions that are executed by the various processing elements/devices. Thus, the GUI(s) may act as a front panel to the system diagram during execution (e.g., for receiving user input and displaying information regarding various variables, functions, devices, and/or sensors (among others) that execute or operate during execution of the system diagram).

Thus, the system diagram may allow for a logical view of a system as well as indications regarding execution targets of code represented in the system diagram. Further, in some embodiments, the system diagram may also indicate physical layouts of the system (e.g., physical connectivity as well as indications regarding execution of the logical elements of the diagram). In primary embodiments, the system diagram at least includes icons representing software (e.g., graphical program code) and one or more graphical indications (e.g., target execution icons) which indicate where these logical elements execute.

Similar to the descriptions above regarding assembly of a graphical program, system diagrams may be assembled manually (e.g., where the user selects icons and connects the icons using wires) or automatically (e.g., in response to user input specifying a desired functionality), as desired. Thus, a system diagram may be assembled manually or automatically and may include logical elements, processing elements, and/or configurable elements, as desired.

Figure 4A:
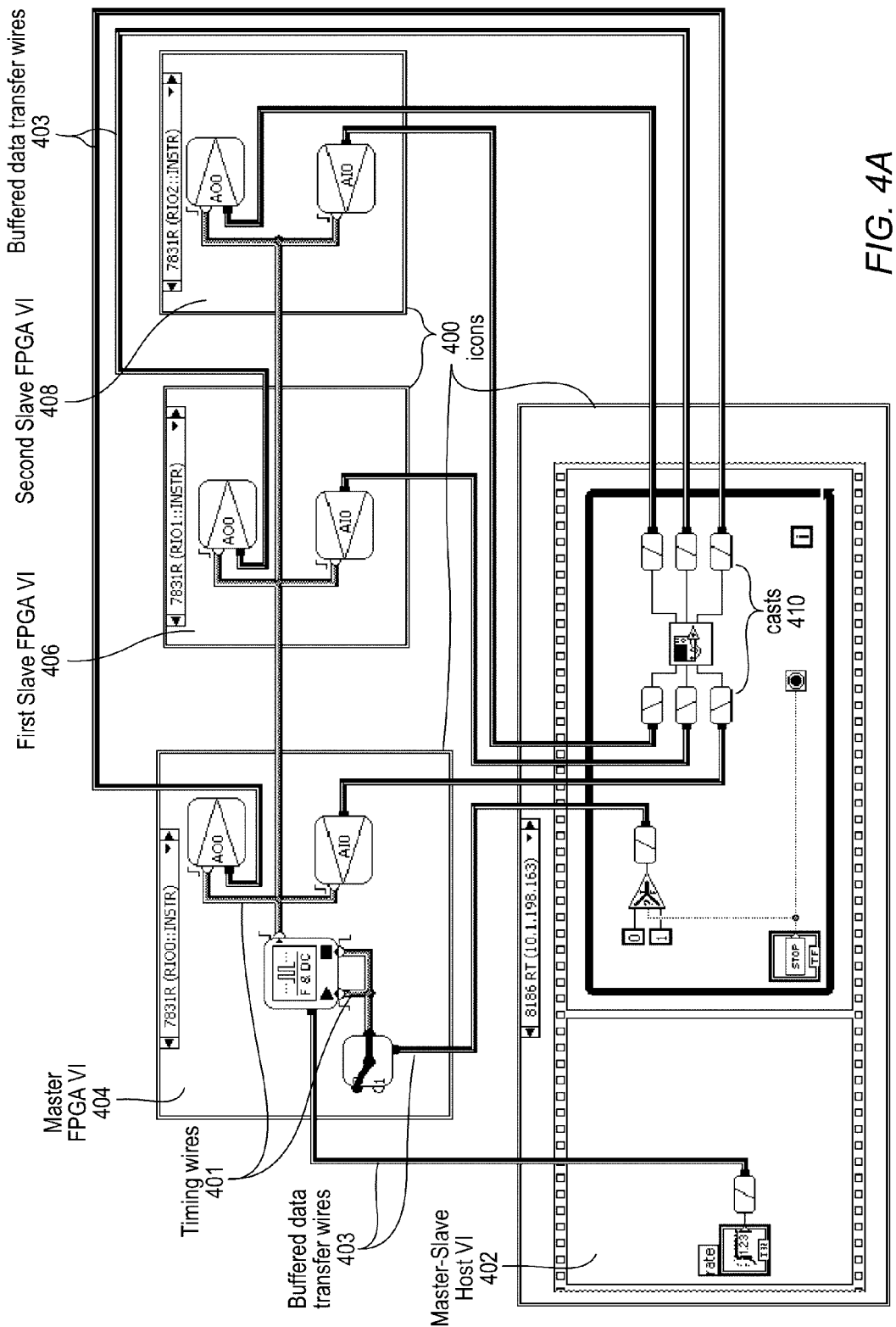
FIG. 4A is a screen shot of an exemplary system diagram which corresponds to FIGS. 3A and 3B.

FIGS. 4A-4F illustrate exemplary system diagrams according to one embodiment. More specifically, FIG. 4A illustrates an exemplary system diagram which is similar to the portions of the graphical program shown in FIGS. 3A and 3B. This system diagram is directed to a system that includes four different execution targets, specifically, a host computer and three FPGAs. Each of these targets is represented by a respective icon 400 (e.g., an execution target icon) that contains a respective graphical program or graphical program portion, in this embodiment, written in "G", the graphical programming language of the LabVIEW graphical development environment provided by National Instruments Corporation, and referred to as a virtual instruments (VI), although it should be noted that the "G" used may be an extended version in accordance with the techniques and features disclosed herein.

As FIG. 4A indicates, a Master-Slave Host VI 602 is shown targeted for execution on host computer (e.g., controller) "8186 RT (10.1.198.163)", as the lower "box" or icon is labeled. This host computer preferably executes a real time execution engine, such as LabVIEW RT, as the "RT" indicates. The Master-Slave Host VI is coupled to respective VIs targeted for execution on respective DAQ boards, specifically, R-Series DAQ boards, as provided by National Instruments Corporation. These three VIs are shown contained in respective icons (e.g., execution target icons), where the icon labeled "7831R (RIO0::INSTR)" contains a Master FPGA VI 404, "7831R (RIO1::INSTR)" contains a first Slave FPGA VI 406, and "7831R (RIO2::INSTR)" contains a second Slave FPGA VI 408. Thus, the icons (e.g., execution target icons) may partition the diagram into regions or portions with targeted execution.

In an exemplary application, the host process (the Master-Slave Host VI executing on host computer "8186 RT (10.1.198.163)") controls performance of data acquisition operations (reads/writes) by the three DAQ boards executing their respective VIs, e.g., stimulating and capturing responses from three units under test (UUT). In one exemplary embodiment, the execution targets may be implemented on respective PXI cards in a PXI chassis, although other implementations may be used as desired.

Additionally, as shown, the Master-Slave Host VI specifies a clock rate via the leftmost node labeled "rate", and sends this rate via a buffered data transfer wire 603 to a clock node in the Master FPGA VI (in "7831R (RIO0::INSTR)"), labeled "F & DC", which operates to generate and send a logical or Boolean clock signal (a sequence of T/F values) to respective Analog Input and Analog Output nodes in 7831R (RIO0::INSTR)", "7831R (RIO1::INSTR)", and "7831R (RIO2::INSTR)", where the Analog Input nodes are each labeled "AI0", and the Analog Output nodes are each labeled "AO0". Note that on/off control of this clock signal generation is via a switch node (shown just below and to the left of the clock node, which is itself controlled by the Master-Slave Host VI, as may be seen. As FIG. 4A shows, timing wires 401 connect the clock node to the switch node and to the Analog Input and Output nodes.

As FIG. 4A further shows, each of the Analog Input and Analog Output nodes is triggered on a rising edge of the clock signal, as indicated by rising signal edges displayed near the terminals of the nodes. On each rising edge of the clock signal, each Analog Output node may operate to receive a value from the Master-Slave Host VI and generate a corresponding analog signal that may, for example, be provided to a respective UUT. As may be seen, the Analog Output nodes are each coupled via a buffered data transfer wire 403 to a node, e.g., a function or analysis node, referred to simply as a function node for brevity, positioned in a while loop in the Master-Slave Host VI, where these three wires exit the VI on the right. Note that the while loop determines the rate that new data values are supplied to the Analog Output nodes (by the function node). The times when the Analog Output nodes consume this data and generate voltages corresponding to these data are controlled by the timing wire. If the time comes to consume a value and none is there, the Analog Output node may not produce a new voltage but rather may retain its previous output state.

Also on this rising edge of the clock signal, each Analog Input node may receive an analog signal, e.g., from the UUT, digitize the signal, and send the value (or values) to the Master-Slave Host VI. Similar to the Analog Output nodes, each Analog Input node is coupled to the function node via a respective wire, where, as may be seen, the wires enter from the top of the VI and couple to the node from the left. Thus, the function node may both control signals to be provided to the UUTs and receive (and possibly process and/or analyze) signals returned from the UUTs.

Note the (six) intervening lozenge-shaped elements 410 coupling the wires to the function node. These elements, which may be referred to as "semantic casts" or simply "casts", may operate as interfaces between nodes that operate in accordance with data flow semantics and wires that do not operate in accordance with data flow semantics. In one example of a system diagram, the wires connecting Analog I/O nodes to a function node are buffered data transfer wires, where data placed on the wire may be stored in a temporary data structure, e.g., a FIFO, before being read from the wire.

Thus, the data on or in the wire is buffered. This is in direct contrast to data flow wires, where the data placed on a wire in one cycle must be consumed (read) that same cycle. These casts may be configured to implement specified rules governing reads and writes of data on the wires. For example, in the case that the buffered data transfer wires use FIFOs, in the case where a FIFO is empty, the function node may be prevented from attempting to read from the wire, and so the cast may impose the rule that when a FIFO is empty, the while loop containing the function node may be halted until data are available again, although it should be noted that is but one example of such a rule.

Figure 4B:
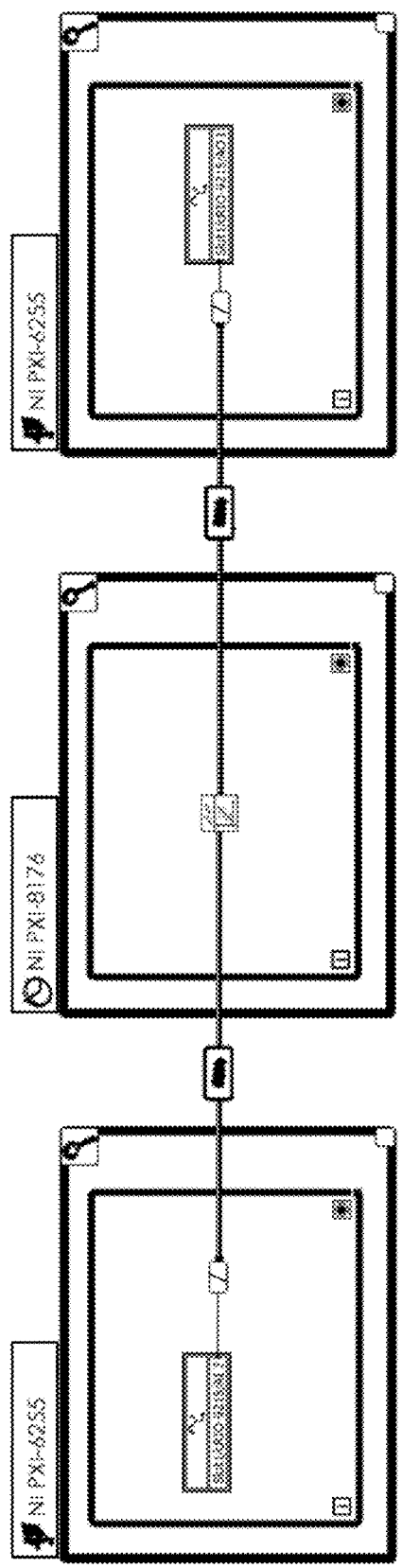
FIGS. 4B-4G are screen shots of exemplary system diagrams according to some embodiments.
Figure 4C:
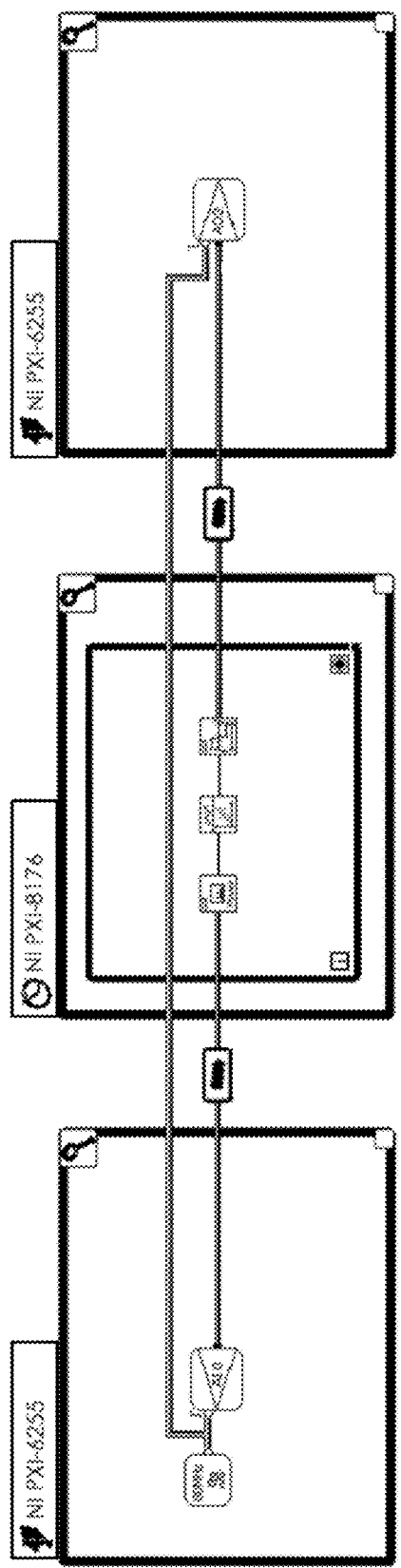
Figure 4D:
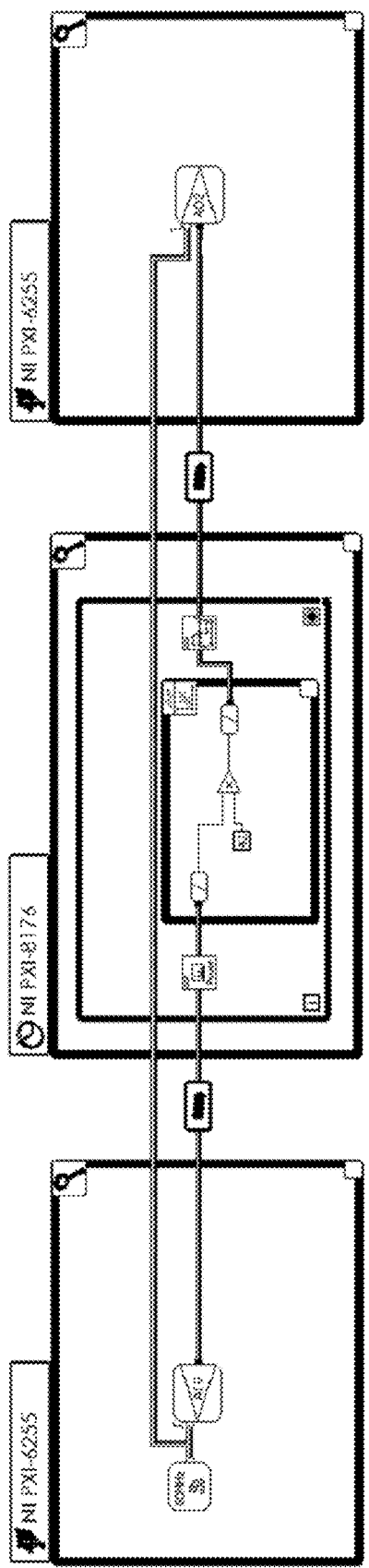
Figure 4E:
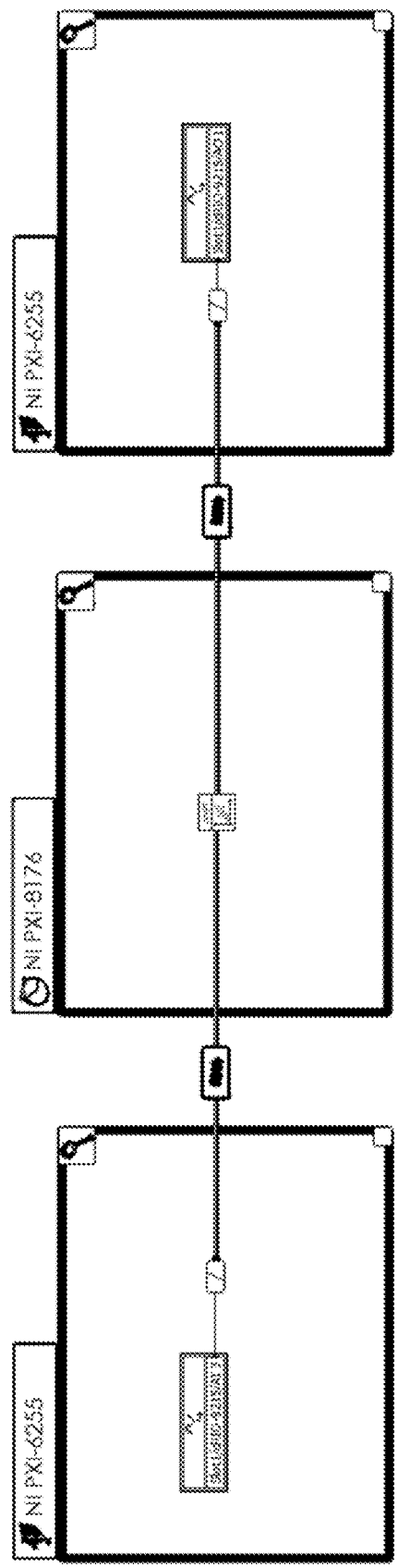

FIG. 4B illustrates an exemplary system diagram with two configurable device icons (representing the same device, NI PXI-6255) are connected to a target execution icon (representing the execution device, NI PXI-8176). As shown, each target execution icon/configurable device icon includes a single node (except for the icon in NI PXI-8176 which is displayed inside a while structure), and where the icons are interconnected by lines. The icon in each target execution icon may represent a plurality of icons which may be interconnected (e.g., the icon of the execution icon may be a VI or sub-VI). FIG. 4C illustrates an exemplary system diagram where the icons of the target execution icons are expanded, and where the ADC's in the NI PXI-6255 are connected by timing wires, and FIG. 4D illustrates an exemplary system diagram where a further sub-VI is expanded. FIG. 4E illustrates an exemplary system diagram where each target execution icon includes a single node, which, similar to FIG. 4B, may represent a plurality of icons that may be interconnected (e.g., the icon of the execution icon may be a VI or sub-VI).

More specifically, FIGS. 4B-4E illustrate system diagrams where a first device (NI PXI-6255) stores a first portion of a graphical program that represents configuration of the device for communication with a second device (NI PXI-8176). In these cases, the second device then provides data (during execution) back to the first device. Thus, FIGS. 4B-4E show both physical and logical relationships among graphical program portions executing on two devices.

Figure 4F:
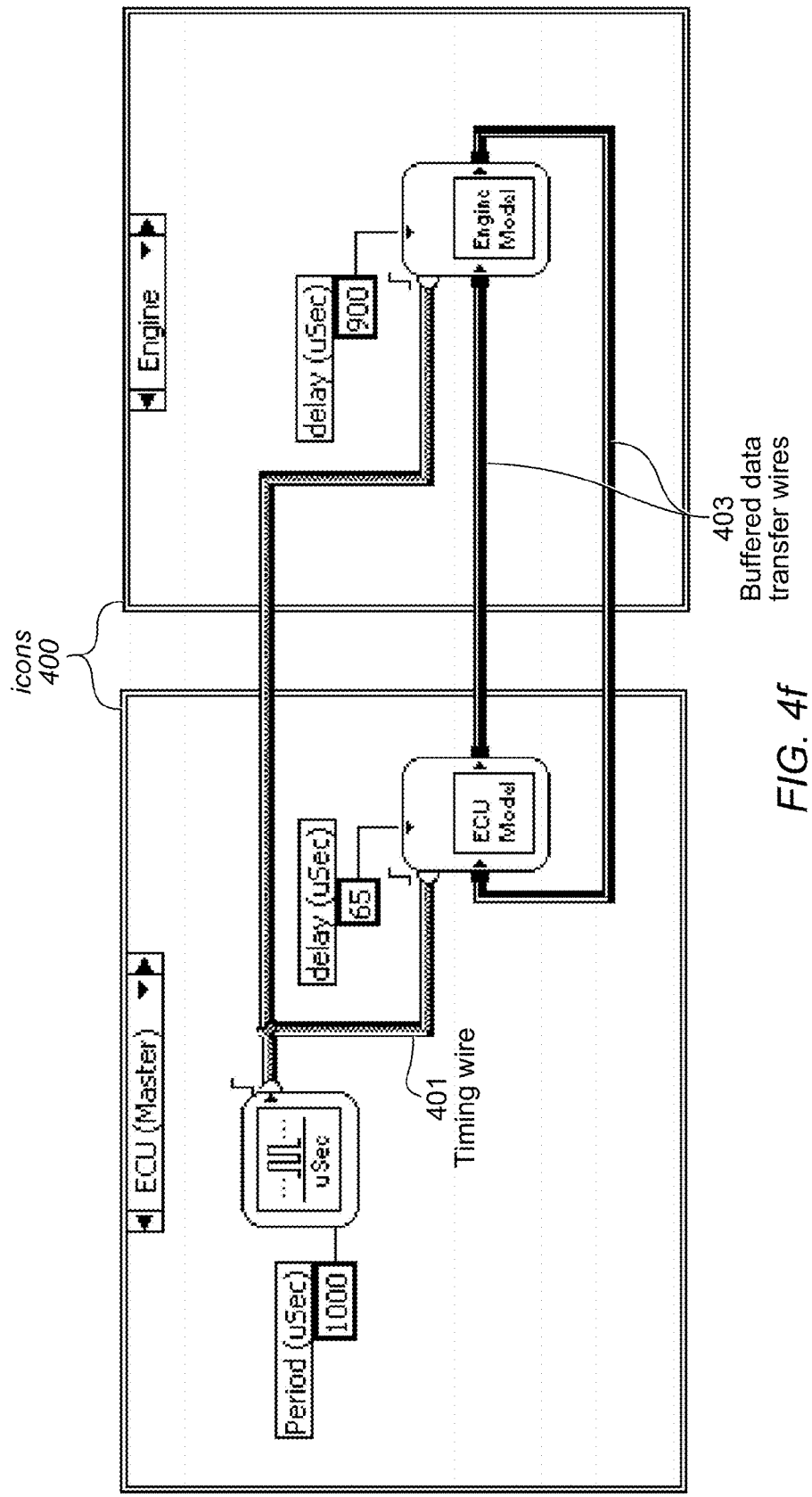

FIG. 4F is an example system diagram that is directed to a distributed modeling according to one embodiment. More specifically, the system diagram of FIG. 4F specifies or implements a system where respective models are targeted for respective execution on two execution targets, as specified by respective icons 400 (e.g., execution target icons) labeled "ECU (Master)" and "Engine".

Figure 4G:
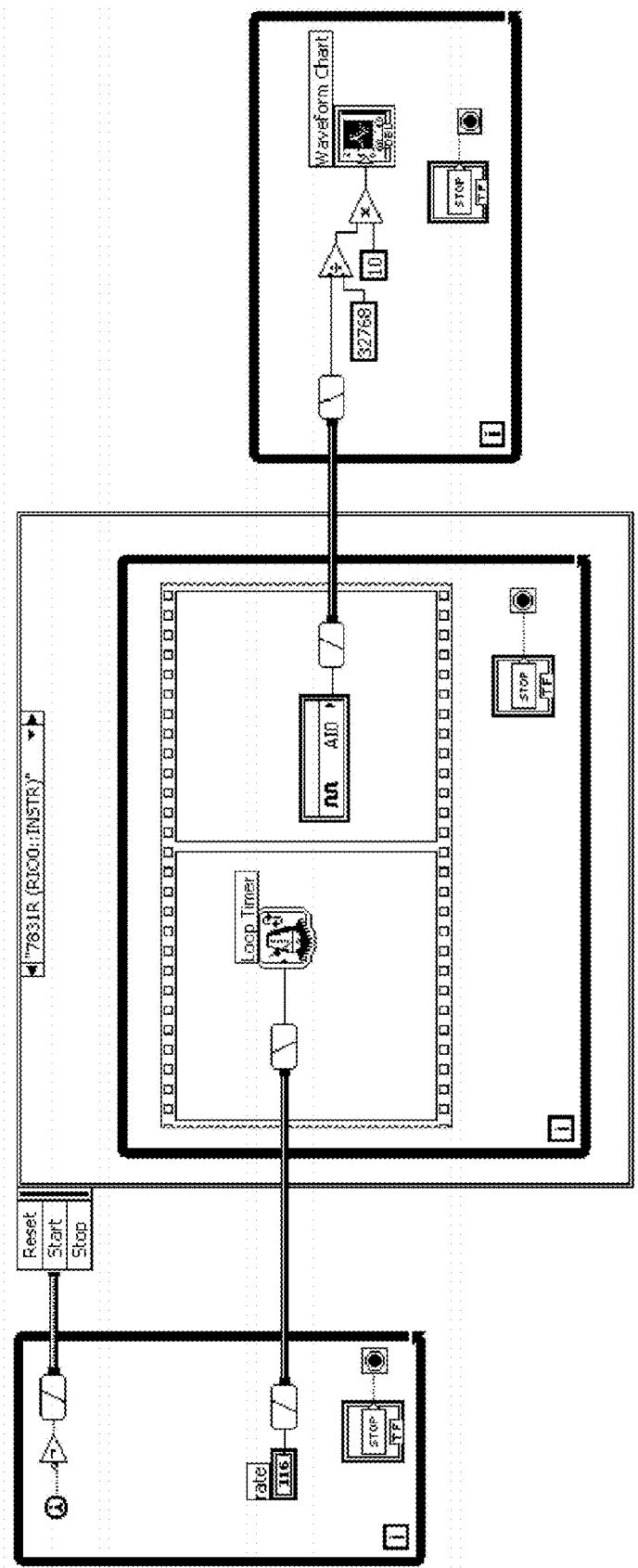

As may be seen, the ECU (Master) icon contains a clock node, labeled uSec and displaying a clock signal symbol, which is configured to generate clock signals with a period of 1000 us (microseconds), and which may provide the clock signals to an ECU Model node, so labeled, via a timing wire (with a specified delay of 65 us) 601. The ECU Model node represents or includes an ECU model that simulates or emulates an engine control unit, e.g., for controlling an engine. The clock node represents the time-triggered network as a clock source and is used to configure the network to produce the desired cycle time. One benefit of this approach is that it may make mapping the application to another communications topology easier, i.e., modifying the application to execute on a different physical system or infrastructure than a time-triggered network. For example, one may wish to execute the application on two R Series cards plugged into the same PCI bus, or on two computers connected by an ordinary network. As another example, one may wish to run the ECU model on one core and the Engine Model on another core of a dual core CPU. Since the time-triggered app in the prior art example of FIG. 4G is so specific to running on a time-triggered network, to run that app on these other topologies, with the same timing, would require discarding most if not all of the original program and writing another one. In contrast, using the approach described herein, only the clock node has to be remapped.

As FIG. 4F also shows, the Engine icon includes an Engine Model node, so labeled, that represents or includes an engine model that simulates or emulates an engine, e.g., an internal combustion engine. Note that the clock node in the ECU (Master) icon is also coupled to the Engine Model node via a timing wire 401. The ECU Model node and the Engine Model node are connected via two buffered data transfer wires 403, thus forming a feedback loop, where the ECU Model node provides input to the Engine Model node, and the Engine Model node's output is provided back to the ECU Model node as input.

Finally, FIG. 4G illustrates a system diagram which includes dialogs for specification of procedures in the system as a whole. As shown on the target execution icon 7831R, a dialog including "Reset", "Start", and "Stop" may be displayed and may be wired to configure the respective resets, starts, and stops of the system. As shown, the 7831R device may begin execution upon receiving a signal via the wire connected to the "start" portion of the dialog. Additionally, FIG. 4G illustrates an implicit context for the graphical program portions on the left and right hand side of the system diagram. In this case, these graphical program portions may be executed by a controlling computer system.

Thus, FIGS. 4A-4G illustrate exemplary system diagrams.

Exemplary Physical Diagram

A physical diagram may refer to a diagram which indicates physical connectivity between physical devices in a system. For example, the physical diagram may visually indicate the connectivity of various physical devices in a measurement system, e.g., a computer connected to a measurement device via an Ethernet network. A physical diagram may show how executable functionality (e.g., of a graphical program or system diagram) is implemented in the real world. Thus, in primary embodiments, the physical diagram includes a plurality of interconnected icons, where each icon in the physical diagram corresponds to a physical device. Additionally, following these embodiments, connections between the icons in the physical diagram represents physical connectivity. For example, the wires between the icons in the physical diagram may represent Ethernet cables, USB connections, Firewire connections, and/or other physical media which connects devices in the system. In some embodiments, physical diagrams (and/or system diagrams) may also be useful for visualizing variable, channel, or network relationships among devices in the system. Note that a certain type of wire may also be used to represent a wireless connection.

Note that in some embodiments, configuration diagrams may have a similar appearance and/or use as physical diagrams. However, configuration diagrams may refer to diagrams which are not linked to physical reality as are physical diagrams. For example, one or more of the devices in a configuration diagram may not be physically present in the system (e.g., it may be simulated or implement on other devices in the system). Thus, physical diagrams represent physical components and physical connectivity of a system and configuration diagrams may represent physical components and/or virtual (or desired) components.

In some embodiments, the physical diagrams/configuration diagrams may be automatically populated or created by performing a discovery process. For example, the development environment may automatically discover all coupled devices as well as the connectivity between the devices. Correspondingly, all of the physical devices may be displayed in the physical diagram/configuration diagram. Discovery may include not only the connectivity and presence of devices, but also their identities, configurations, available resources, and/or other characteristics.

An exemplary physical diagram is shown in the bottom portion of FIGS. 5A and 5B (described in more detail below).

Figure 5A:
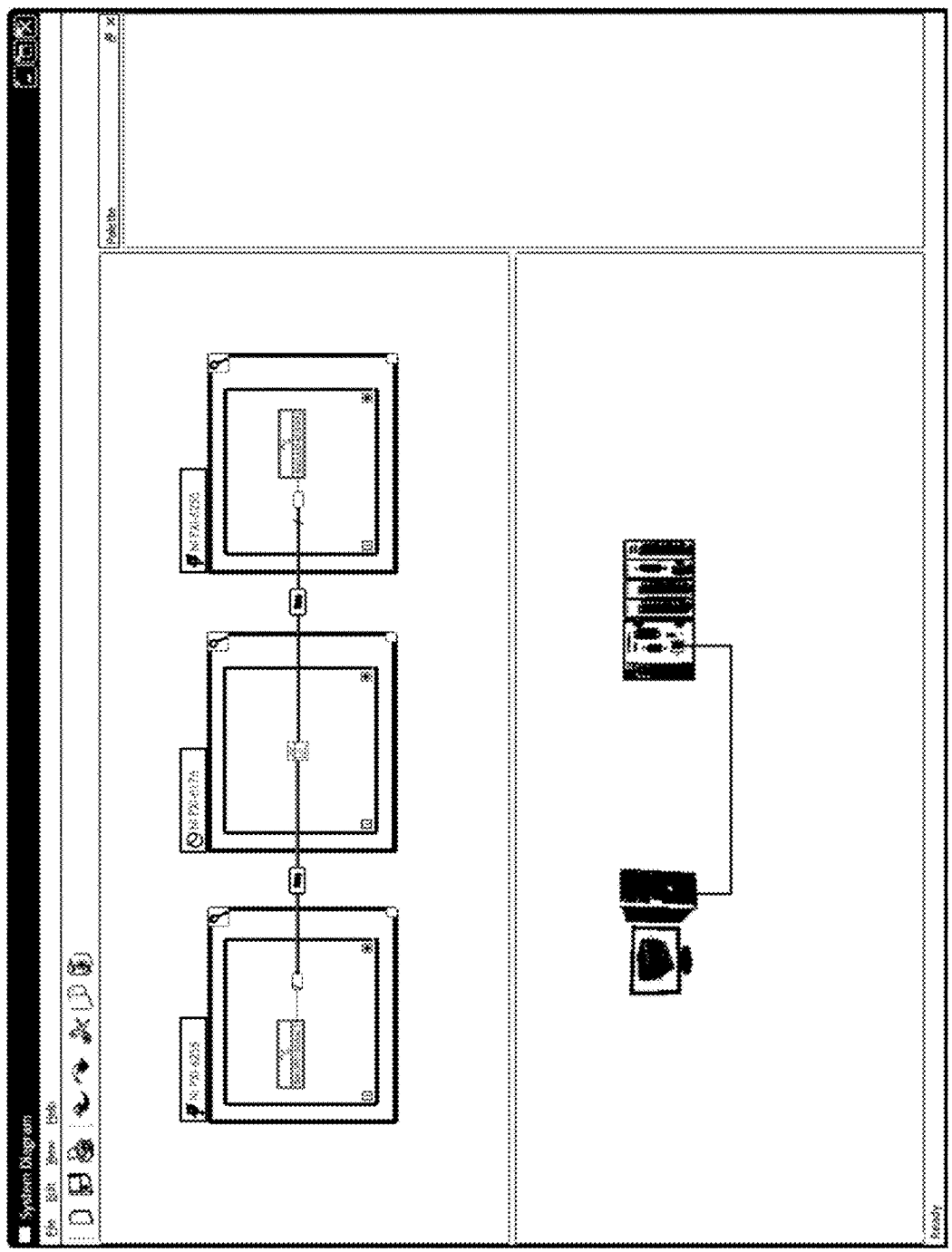
FIGS. 5A and 5B are screen shots of a split view of a system diagram and a physical diagram according to one embodiment.
Figure 5B:
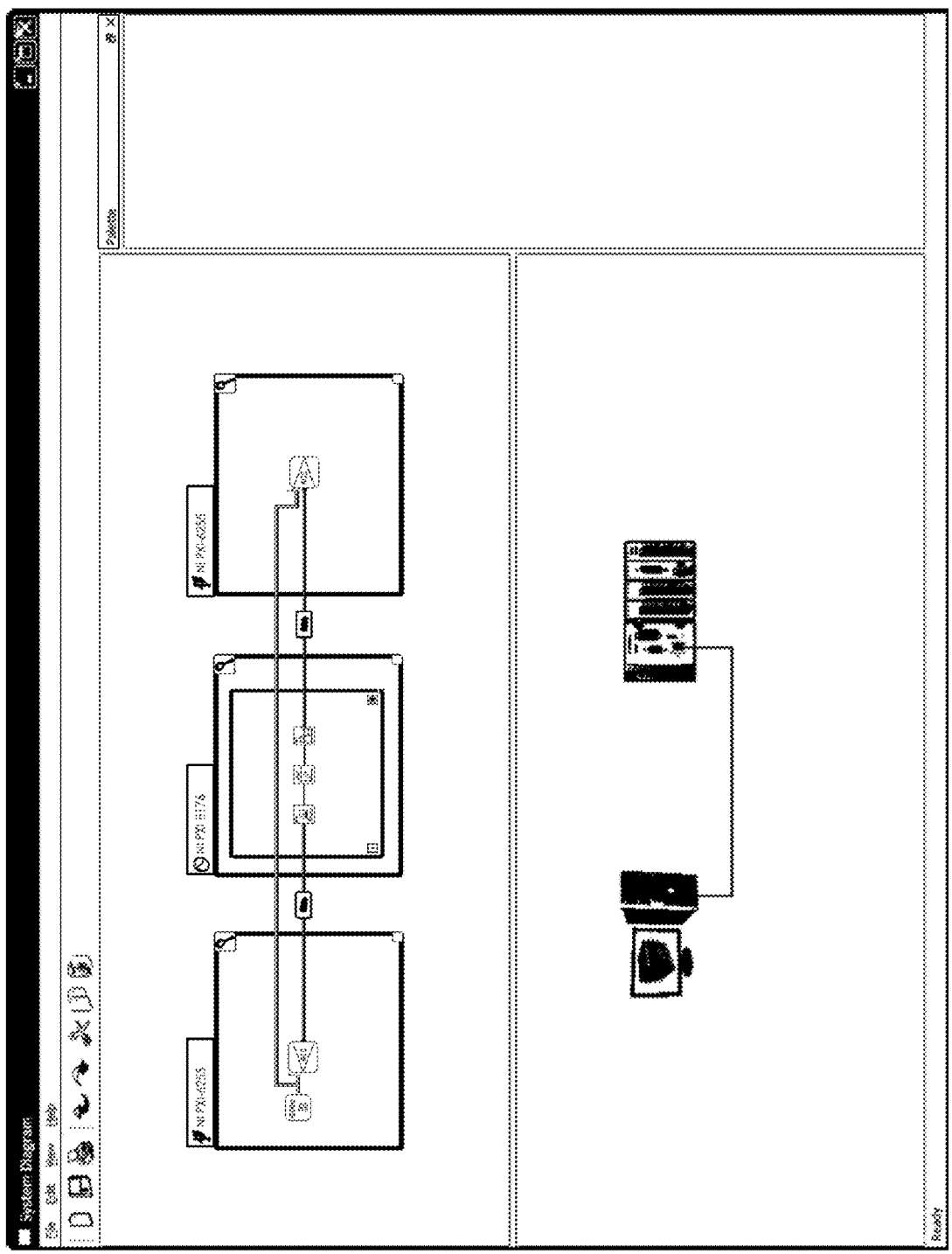

FIGS. 5A and 5B—Synergy of Multiple Diagrams

In some embodiments, it may be desirable to display or use multiple diagrams. For example, graphical programs may allow users to see a logical view of a system. Similarly, system diagrams may provide an easy and intuitive means for visualizing the logical view of a systems as well as locations of execution and relationships between other physical or virtual devices of the system. Thus, a system diagram may allow a user to easily understand functionality and logical flow of execution over an entire system. Physical diagrams and/or configuration diagrams, on the other hand, may allow users to view the physical components and connectivity of the physical components. Thus, each of the various diagrams may provide different views of a system.

In some embodiments, it may be desirable to allow a user to choose one or more of these diagrams or "views" of the system. For example, the user may want to see a purely logical view of a system. In this example, a graphical program may be displayed for the user, e.g., on the computer system 82. The graphical program may be displayed with or without graphical indications (e.g., target execution icons or configurable device icons) which visually indicate where portions of the graphical program are executed. Alternatively, the user may desire a system view of the system where both logical elements and execution indications are displayed. Additionally, the system view may include icons representing hardware devices (e.g., processing elements or configurable elements) that may not be present in the graphical programs. Finally, the user may want to view a physical representation of the system; correspondingly, the physical diagram may be displayed on the display of the computer system 82.

In some embodiments, the multiple diagrams or views may each take up the entirety of the display. Thus, the user may, in one embodiment, toggle between the different views. Alternatively, the diagrams or views may be displayed in a "split view" where a plurality of diagrams or views are shown on the display, or the different diagram are shown separately and concurrently on multiple display devices. For example, in one embodiment, a split view may be displayed where a system diagram or graphical program is displayed in a top portion and the physical view (physical diagram) may be displayed on the bottom portion. In another example, in one embodiment, a split view may be displayed where a system diagram or graphical program is displayed on a first display device and the physical view (physical diagram) may be displayed on a second display device. This may be especially useful for conveying overall system information to the user. Thus, in one embodiment, the user may see a logical view of the system which may or may not indicate where logical elements execute as well as a physical view of the system allowing intuitive understanding of the entire system in one view.

In some embodiments, the development environment may allow the user to see correlations between the logical view and the physical view. For example, following the split view embodiment from above, a user may be able to select a physical component in the physical view and corresponding graphical indications in the logical view may be visually modified to indicate where graphical program portions execute. For example, the user may select a computer system in the physical view and one or more target execution icons (or possibly icons comprised in the target execution icons themselves) may "pop" (e.g., appear to jump or bounce on the screen), change colors, become highlighted, marching ants, and/or otherwise be visually indicated. Similarly, the user may select various components in the logical view and corresponding hardware devices in the physical view may be highlighted or visually indicated. Thus, the user may easily discern which logical elements in the system diagram or graphical program correspond to the physical devices shown in the physical diagram.

Additionally, the user may be able to associate elements in the physical view with elements in the logical view or vice/versa. For example, the user may select a physical device in the physical diagram and invoke creation of an icon in the system diagram/graphical program. In one embodiment, the user may simply select one of the device and drag that device into the system diagram to invoke creation of an icon (e.g., an execution target icon or configurable device icon) in the system diagram which corresponds to that device. Alternatively, the user may select various logical elements or nodes in the system diagram and associate those icons or nodes with the devices in the physical diagram. As one example, the user may select one or more icons (e.g., a graphical program portion) in the system diagram and associate the icons with a device in the physical diagram (e.g., by dropping the icons on the device). Correspondingly, a new target execution icon or configurable icon (among others) that is associated with the device may be displayed in the system diagram with the one or more icons. Additionally, the target execution icon or configurable icon may be displayed according to connectivity of the device in the system, if desired.

As shown, FIGS. 5A and 5B illustrate exemplary split views of a system diagram and a physical diagram. Note that these Figures correspond to the system diagrams illustrated in FIGS. 4B-4E. As shown in 5A, the top portion illustrates the system diagram of FIG. 4B and the bottom portion shows the physical connectivity between the two devices of the system (in this case from a port of a chassis to a computer). More specifically, FIG. 5A depicts a data streaming application where data is read from the PXI-6255, streamed over DMA to the PXI-8176, which after modifying the data, streams data back to the PXI-6255 to be output. The FIFO affordance of the wire is used as an access point for configuring buffering policies for the configurable wire. This Figure also illustrates the concept that a single physical device (in this case the PXI-6255) can have multiple logical representations Similarly, FIG. 5B shows the same split view with an expanded system diagram (from FIG. 4C). Thus, FIGS. 5A and 5B show exemplary split views of a system diagram and physical diagram.

Note that the above described views are exemplary only and that other views are contemplated. For example, in some embodiments, there may be a single view, e.g., of a system diagram, where all physical and logical connectivity is indicated. Thus, in these embodiments, the user may easily understand the entirety of the system. FIGS. 6A and 6B illustrate exemplary diagrams of this case. As shown in FIG. 6A, the cRIO-9014 Microprocessor is connected to cRIO-9103 which is connected to 9211. In this case, instead of separating the logical components of the cRIO-9014 and cRIO-9103 separate target execution icons, the physical and logical relationship is shown in a single view. Similarly, FIG. 6B shows this single view, but also shows the logic of the cRIO-9014. Note that in various embodiments, the user may switch between any of the views/diagrams described above, as desired. Additionally, the user may choose to "morph" any available view to another view. For example, the user may be viewing a physical diagram of the system and may invoke a "morph" or graphical change in the diagram to a different view, such as the combined view described above. Further embodiments related to morphing or transitioning between views are described below. Alternatively, the user may invoke a conversion of the physical diagram to a logical view or system diagram, as desired. Note that these views/changes are exemplary only and that others are envisioned.

Alternatively, or additionally, more than two diagrams may be shown simultaneously. For example, two or more of a physical diagram, a configuration diagram, a system diagram, and/or a graphical program (among other diagrams) may be displayed at the same time. In some embodiments, various ones of the diagrams may be overlaid in an intelligent manner, to convey an intuitive understanding of the system to the user. For example, when two or more diagrams are overlaid, corresponding nodes or icons in the different diagrams may be shown in the same position on the display to indicate correspondence. In one embodiment, a diagram may be automatically modified to allow this correspondence to be readily displayed. Thus, the above described views are exemplary other, and other views are envisioned.

In one embodiment, one or more of the above described diagrams may be used for mapping system configurations to existing system configurations. For example, in one embodiment, the user may wish to map a diagram (e.g., containing specified physical and logical elements) to an existing (physical) system. For example, the existing diagram may have physical components (e.g., devices) which differ from the user's existing (physical) system. The development environment may be able to map the diagram (e.g., automatically) to the existing system and/or simulate the missing devices that are indicated in the diagram. Thus, diagrams may be mapped onto real systems by transferring functionality to existing systems or via simulation of the missing components (among others).

Thus, FIGS. 3A-6B illustrate exemplary diagrams/views of systems.

Figure 7:
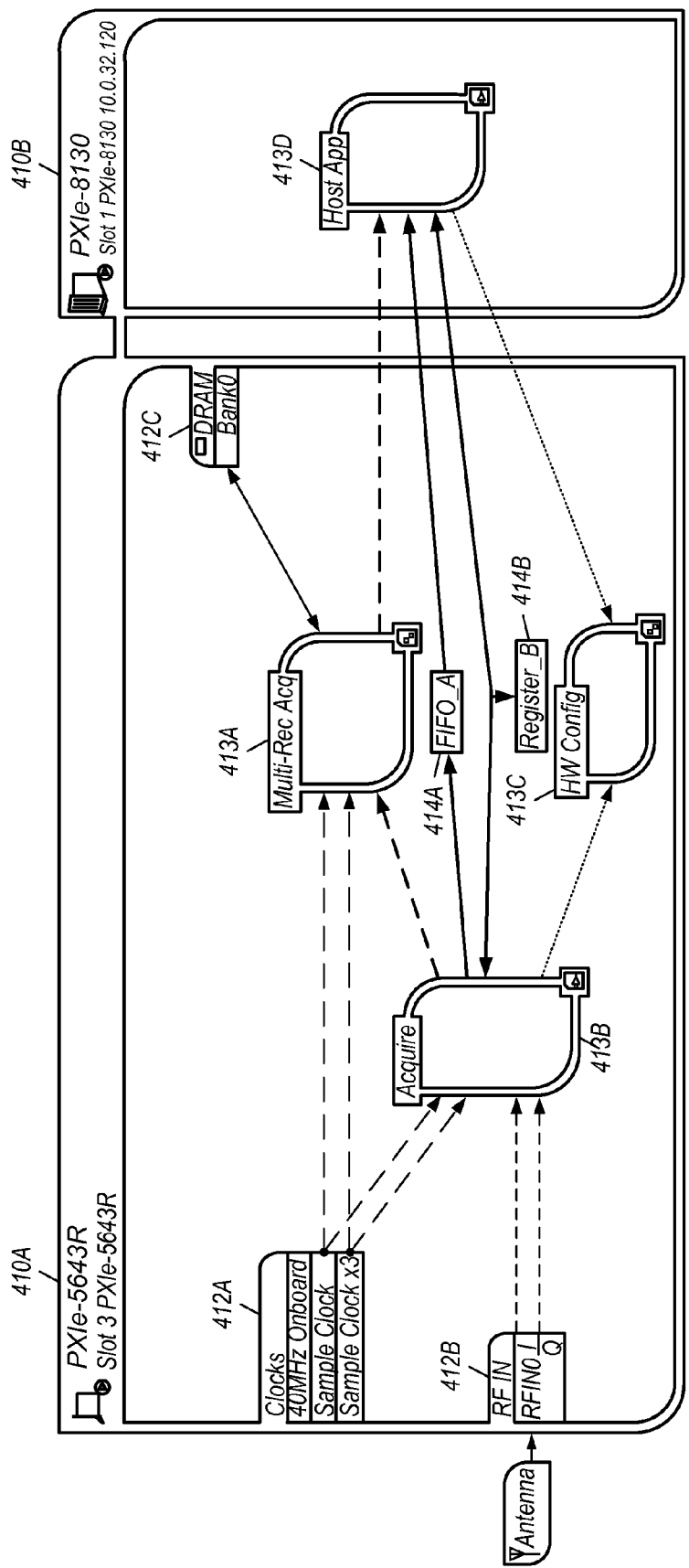
FIG. 7 illustrates one example of a system diagram in which nodes are connected using interface wires.

FIG. 7—System Diagram with Interface Wires

In various embodiments, any of various techniques may be used to configure the nodes in a system diagram to communicate with each other. In some embodiments a node may implement one or more interfaces, where each interface includes one or more functions that can be called by other nodes in the system diagram. The user may configure one node (referred to herein as a "consumer node") to use an interface provided by another node (referred to herein as an "owner node") by connecting the consumer node to the owner node via a particular type of wire referred to herein as an "interface wire". FIG. 7 illustrates one example of a system diagram in which nodes are connected using interface wires to implement an RF communications application.

In the example of FIG. 7, the system diagram includes two target execution icons 410A and 410B. Each of the target execution icons represents a target device on which processes represented by other nodes are deployed and execute. This is visually represented by displaying the respective process nodes within the target execution icons.

In this example, there are three different types of process nodes: custom code process nodes, native process nodes, and hardware process nodes. Custom code process nodes represent processes that are implemented by user-defined or user-supplied software code. The software code may be any kind of program code, including graphical code (e.g., a graphical program, such as a LabVIEW VI for example) or text-based code (e.g., program code written in C, C++, Java™, or another text-based programming language).

Native process nodes represent processes that are native to the system diagram. For example, the development environment used to create the system diagram may provide various process nodes that implement communication or data exchange processes commonly needed for many applications.

Hardware process nodes represent processes implemented by hardware devices or by driver software associated with a hardware device.

In the example of FIG. 7, the target execution icon 410A represents a PXIe-5643R hardware device. Various process nodes are displayed inside the target execution icon 410A, indicating that the respective processes are deployed on and execute on the PXIe-5643R hardware device. These process nodes include three hardware process nodes 412A-C, three custom code process nodes 413A-C, and two native process nodes 414A-B. The hardware process node 412A represents clock processes implemented by clock circuitry of the PXIe-5643R hardware device. The hardware process node 412B represents an RF input process implemented by input circuitry of the PXIe-5643R hardware device. The hardware process node 412C represents a memory storage process implemented by memory storage circuitry of the PXIe-5643R hardware device. The custom code process nodes 413A, 413B, and 413C represent software processes implemented by three respective portions of custom software code, such as three different graphical programs for example. The native process node 414A represents a FIFO (First-In, First-Out) process for buffering data according to a FIFO model. The native process node 414B represents a register process for modeling data exchange as a register.

The target execution icon 410B represents a PXIe-8130 hardware device. Only one process node is included in the target execution icon 410B: the custom code icon 413D which represents a software process implemented by a custom graphical program.

Figure 8:
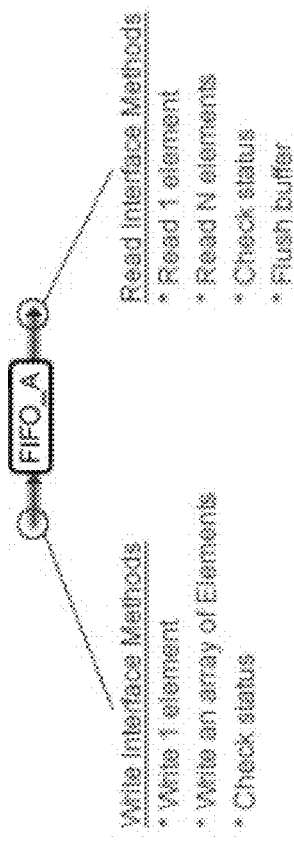
FIGS. 8-12 illustrate interfaces implemented by nodes in the system diagram of FIG. 7.

Each of the process nodes illustrated in FIG. 7 implements one or more interfaces, where each interface defines one or more functions that can be called by other process nodes in the system diagram. For example, as illustrated in FIG. 8, the native FIFO node 414A implements two interfaces: a Write interface and a Read interface. The Write interface includes three functions: a function for writing one element to the FIFO buffer; a function for writing an array of elements to the FIFO buffer; and a function for checking the status of the FIFO buffer. The Read interface includes four functions: a function for reading one element from the FIFO buffer; a function for reading an array of N elements from the FIFO buffer; a function for checking the status of the FIFO buffer; and a function for flushing the FIFO buffer.

Figure 9:
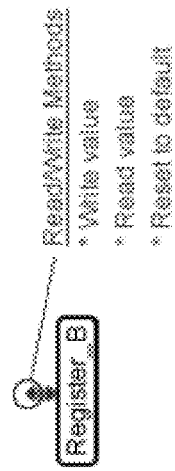

As illustrated in FIG. 9, the native Register node 414B implements a single interface which includes three functions: a function for writing a value to the register; a function for reading a value from the register; and a function for resetting the register to a default state.

Figure 10:
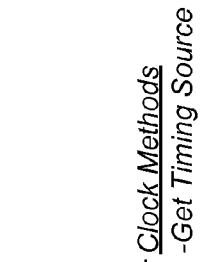

As illustrated in FIG. 10, the DRAM hardware node 412C implements a single interface that includes four functions: a function for configuring a memory block; a function for writing a value to memory; a function for reading a value from memory; and a function for resetting memory to a default state.

Figure 11:
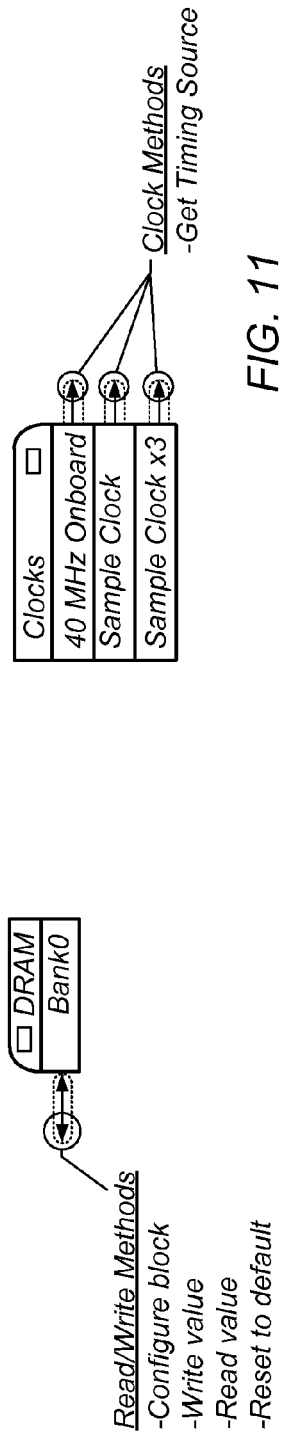

As illustrated in FIG. 11, the Clocks hardware node 412A implements a single interface that includes a function for getting a clock timing source.

Figure 12:
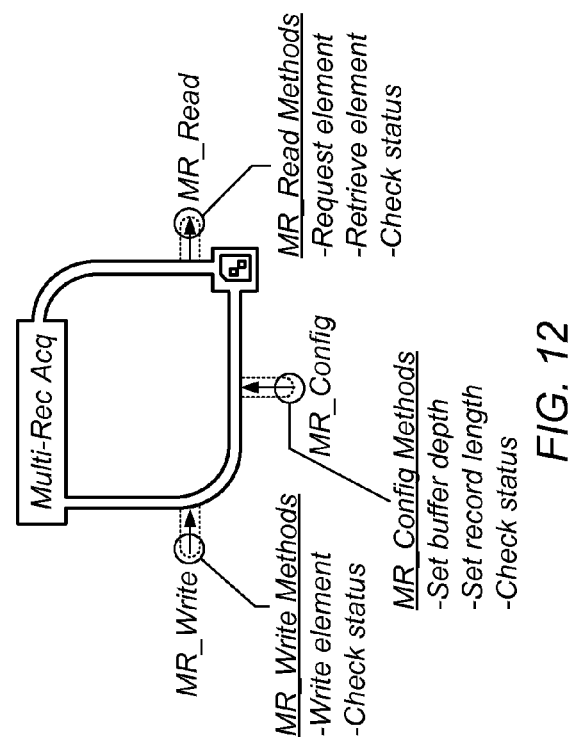

As illustrated in FIG. 12, the Multi-Rec Acq custom code node 413A implements three interfaces: a Write interface, a Read interface, and a Config interface. The Write interface includes two functions: a function for writing an element; and a function for checking status. The Read interface includes three functions: a function for requesting an element; a function for retrieving an element; and a function for checking status. The Config interface includes three functions: a function for setting a buffer depth; a function for setting a record length; and a function for checking status.

A process node may be configured to access the interface of another process node in the system diagram connecting the respective nodes via an interface wire. The node that owns the interface is referred to as the owner node, and the node that accesses the interface is referred to as the consumer node. In the system diagram of FIG. 7, each wire that connects two respective nodes is an interface wire. For example, the custom code Acquire node 413B consumes the Write interface of the native FIFO node 414A, and calls one of the write functions of the Write interface to write data to the FIFO buffer. The custom code Host App node 413D consumes the Read interface of the native FIFO node 414A, and calls one of the read functions of the Read interface to read data from the FIFO buffer. As another example, the Multi-Rec Acq custom code node 413A consumes the interface of the Clock hardware node 412A to get a clock source to use.

It is noted that a particular node can be both an owner node and a consumer node. For example, in addition to consuming the interface of the Clock hardware node 412A, the Multi-Rec Acq custom code node 413A also exposes its own interfaces to the Acquire custom code node 413B. It is also noted that two nodes can be both a consumer and an owner with respect to each other. For example, a node A may consume an interface of a node B, and the node B may also consume an interface of the node A.

It is also noted that the owner node and the consumer node may both be deployed on the same hardware device, or may be deployed on different devices. For example, in FIG. 7 the Host App custom code node 413D consumes the interface of the HW Config custom code node 413C. The Host App custom code node 413D is deployed on the PXIe-8130 hardware device, and the HW Config custom code node 413C is deployed on the PXIe-5643R hardware device.

Figure 13:
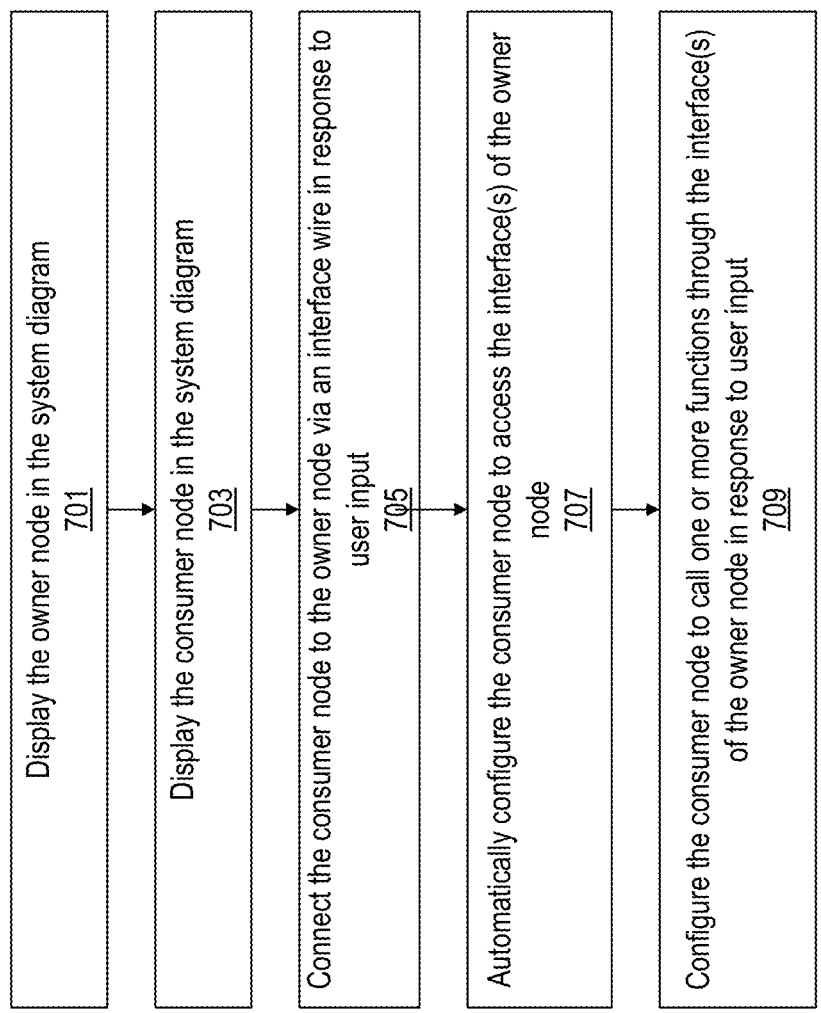
FIG. 13 is a flowchart diagram illustrating the use of an interface wire to configure a consumer node to access an interface of an owner node.

FIG. 13 is a flowchart diagram illustrating the use of an interface wire to configure a consumer node to access an interface of an owner node according to one embodiment. As indicated in blocks 701 and 703, the consumer node and the owner node may be displayed in the system diagram. For example, the software application used to create the system diagram may enable the user to select and include various nodes in the system diagram.

As indicated in block 705, the consumer node may then be connected to the owner node via an interface wire in response to user input. For example, the system diagram software application may provide a connector tool which the user can use to display an interface wire connecting the two nodes. In some embodiments the user may be able to use different kinds of wires to connect the nodes in the system diagram. An interface wire is a wire that enables the consumer node to access one or more interfaces of the owner node. This may differ from other types of wires, such as data flow wires which indicate data flowing from one node to another. In some embodiments the interface wire may be displayed with a visual appearance that indicates which of the connected nodes is the consumer node, and which is the owner node. For example, in some embodiments an arrowhead or other graphical appearance may be used to distinguish between the consumer node and the owner node.

In response to the user input connecting the consumer node to the owner node via the interface wire, the system diagram application may automatically configure the consumer node to access one or more interfaces of the owner node. In some embodiments, if the owner node implements multiple interfaces, the consumer node may automatically be configured to access all of the interfaces. In other embodiments the user may select a particular interface, and the consumer node may be configured to access only the selected interface.

In various embodiments, the consumer node may be automatically configured to access the interface(s) of the owner node in any of various ways. The configuration of the consumer node may be performed differently depending on how the consumer node is implemented. As discussed above, in some embodiments the consumer node may be a custom code node that represents a process implemented by program code, such as graphical code or text-based code. In such an embodiment the system diagram application may configure the consumer node to access the interface(s) of the owner node by automatically modifying the program code that implements the consumer node, and/or by automatically modifying information used by a software application operable to edit the consumer node. For example, if the consumer node is implemented by text-based program code then the system diagram application may automatically add one or more lines of code to the program code to enable the program code to access the interface(s) of the owner node. As another example, if the consumer node is implemented by graphical code in a graphical program then the system diagram application may automatically modify the graphical program to enable the graphical program to access the interface(s) of the owner node. The graphical program may be modified in various ways, such as by adding one or more nodes and/or wire to the graphical program. For example, in some embodiments a node that references the interface of the owner node may be automatically added to the graphical program. In other embodiments the system diagram application may not modify the graphical program itself, but may add one or more nodes representing the interface or the functions contained in the interface to a library or palette of nodes that are available for inclusion in the graphical program. The user may then select the desired node(s) from the palette and add the node(s) to the graphical program to configure the graphical program to access the interface of the owner node.

As discussed above, the interface(s) of the owner node may include multiple functions. As indicted in block 709, the user may configure the consumer node to call one or more of the functions through the interface(s). The user may configure the consumer node to call the one or more functions in various ways, e.g., depending on the implementation of the consumer node.

Figure 14:
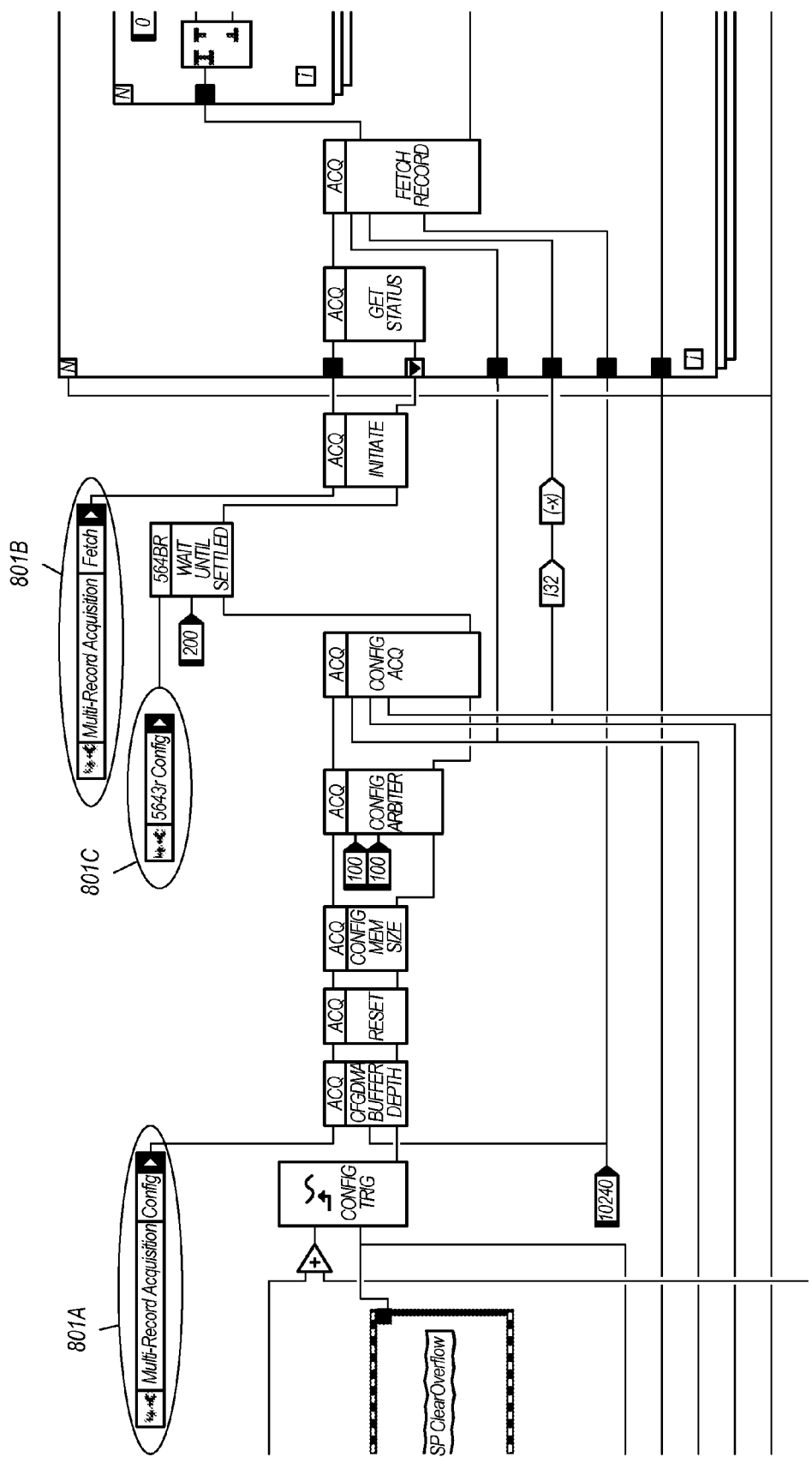
FIG. 14 illustrates an example of a graphical program that implements one of the nodes illustrated in the system diagram of FIG. 7.

FIG. 14 illustrates a portion of graphical program code that implements the Host App custom code node 413D. As illustrated in FIG. 7, the Host App custom code node 413D is a consumer of the Multi-Rec Acq node 413A. In the example of FIG. 14, the user has configured the graphical program code that implements the Host App custom code node 413D to call a function of the Config interface of the Multi-Rec Acq node 413A using the reference node 801A. The user has also configured the graphical program code to call a function of the Read interface of the Multi-Rec Acq node 413A using the reference node 801B. The Host App custom code node 413D is also a consumer of the HW Config node 413C. The user has configured the graphical program code to call a function of the interface of the HW Config node 413C using the reference node 801C.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
   a computer system displaying a first node and a second node in a system diagram, wherein the first node comprises program code, wherein the second node implements one or more software object interfaces, wherein each software object interface includes one or more callable software functions, wherein the system diagram visually indicates one or more hardware devices on which the first node and the second node are deployed;
   the computer system adding and displaying a wire connecting the first node to the second node in response to user input; and
   the computer system automatically configuring the first node to access at least one of the one or more software object interfaces of the second node in response to said adding and displaying the wire, wherein said automatically configuring comprises automatically modifying the program code of the first node to enable the first node to use the one or more callable software functions of the second node, and wherein after said automatically configuring, the first node is operable to call the one or more callable software functions of the at least one software object interface at runtime to communicate with the second node;
   wherein the first node is implemented by a graphical program;
   wherein the computer system automatically configures the first node to access the at least one of the one or more interfaces of the second node by automatically modifying the graphical program.

2. The method of claim 1,
   wherein the graphical program includes a plurality of interconnected nodes visually indicating functionality of the graphical program;
   wherein said automatically modifying the graphical program includes automatically adding one or more nodes to the graphical program.

3. The method of claim 1,
   wherein the first node is implemented by text-based program code;
   wherein the computer system automatically configures the first node to access the at least one of the one or more interfaces of the second node by automatically adding one or more lines of code to the text-based program code.

4. The method of claim 1, further comprising:
   the computer system displaying a first target execution icon in the system diagram, wherein the first target execution icon represents a first hardware device, wherein the first node is associated with the first target execution icon to visually indicate that the first node is deployed on the first hardware device; and
   the computer system displaying a second target execution icon in the system diagram, wherein the second target execution icon represents a second hardware device, wherein the second node is associated with the second target execution icon to visually indicate that the second node is deployed on the second hardware device.

5. The method of claim 1,
   wherein the second node represents a process implemented by user-supplied software code.

6. The method of claim 1,
   wherein the second node represents a process native to the system diagram.

7. The method of claim 1,
   wherein the second node represents a process implemented by one or more of:
   a hardware device;
   driver software associated with a hardware device.

8. The method of claim 1,
   wherein said automatically configuring the first node to access at least one of the one or more interfaces of the second node comprises configuring the first node to access a particular interface of the second node;
   wherein the method further comprises the computer system automatically configuring the first node to call one or more particular functions of the particular interface of the second node in response to user input.

9. A system comprising:
   one or more processors; and
   memory storing program instructions;
   wherein the program instructions are executable by the one or more processors to:
   display a first node and a second node in a system diagram, wherein the first node comprises program code, wherein the second node implements one or more software object interfaces, wherein each software object interface includes one or more callable software functions, wherein the system diagram visually indicates one or more hardware devices on which the first node and the second node are deployed;
   add and display a wire connecting the first node to the second node in response to user input; and
   automatically configure the first node to access at least one of the one or more software object interfaces of the second node in response to said adding and displaying the wire, wherein said automatically configuring comprises automatically modifying the program code of the first node to enable the first node to use the one or more callable software functions of the second node, and wherein after said automatically configuring, the first node is operable to call the one or more callable software functions of the at least one software object interface at runtime to communicate with the second node;
   wherein the first node is implemented by a graphical program;
   wherein the program instructions are executable by the one or more processors to automatically configure the first node to access the at least one of the one or more interfaces of the second node by automatically modifying the graphical program.

10. The system of claim 9,
wherein the graphical program includes a plurality of interconnected nodes visually indicating functionality of the graphical program;
wherein said automatically modifying the graphical program includes automatically adding one or more nodes to the graphical program.

11. The system of claim 9,
wherein the first node is implemented by text-based program code;
wherein the program instructions are executable by the one or more processors to automatically configure the first node to access the at least one of the one or more interfaces of the second node by automatically adding one or more lines of code to the text-based program code.

12. The system of claim 9, wherein the program instructions are further executable by the one or more processors to:
display a first target execution icon in the system diagram, wherein the first target execution icon represents a first hardware device, wherein the first node is associated with the first target execution icon to visually indicate that the first node is deployed on the first hardware device; and
display a second target execution icon in the system diagram, wherein the second target execution icon represents a second hardware device, wherein the second node is associated with the second target execution icon to visually indicate that the second node is deployed on the second hardware device.

13. The system of claim 9,
wherein said automatically configuring the first node to access at least one of the one or more interfaces of the second node comprises automatically configuring the first node to access a particular interface of the second node;
wherein the program instructions are further executable by the one or more processors to automatically configure the first node to call one or more particular functions of the particular interface of the second node in response to user input.

14. A non-transitory computer-readable memory medium storing program instructions executable to:
display a first node and a second node in a system diagram, wherein the first node comprises program code, wherein the second node implements one or more software object interfaces, wherein each software object interface includes one or more callable software functions, wherein the system diagram visually indicates one or more hardware devices on which the first node and the second node are deployed;
add and display a wire connecting the first node to the second node in response to user input; and
automatically configure the first node to access at least one of the one or more software object interfaces of the second node in response to said adding and displaying the wire, wherein said automatically configuring comprises automatically modifying the program code of the first node to enable the first node to use the one or more callable software functions of the second node, and wherein after said automatically configuring, the first node is operable to call the one or more callable software functions of the at least one software object interface at runtime to communicate with the second node;
wherein the first node is implemented by a graphical program;
wherein the program instructions are executable to automatically configure the first node to access the at least one of the one or more interfaces of the second node by automatically modifying the graphical program.

15. The non-transitory computer-readable memory medium of claim 14,
wherein the graphical program includes a plurality of interconnected nodes visually indicating functionality of the graphical program;
wherein said automatically modifying the graphical program includes automatically adding one or more nodes to the graphical program.

16. The non-transitory computer-readable memory medium of claim 14, wherein the program instructions are further executable to:
display a first target execution icon in the system diagram, wherein the first target execution icon represents a first hardware device, wherein the first node is associated with the first target execution icon to visually indicate that the first node is deployed on the first hardware device; and
display a second target execution icon in the system diagram, wherein the second target execution icon represents a second hardware device, wherein the second node is associated with the second target execution icon to visually indicate that the second node is deployed on the second hardware device.

17. The non-transitory computer-readable memory medium of claim 14,
wherein said automatically configuring the first node to access at least one of the one or more interfaces of the second node comprises configuring the first node to access a particular interface of the second node;
wherein the program instructions are further executable to automatically configure the first node to call one or more particular functions of the particular interface of the second node in response to user input.

* * * * *